United States Patent
Yao et al.

(10) Patent No.: US 12,015,503 B2
(45) Date of Patent: Jun. 18, 2024

(54) VIRTUAL NETWORK COMMUNICATION METHOD, DEVICE, AND SYSTEM

(71) Applicant: HUAWEI TECHNOLOGIES CO., LTD., Shenzhen (CN)

(72) Inventors: Qi Yao, Beijing (CN); Wenyong Han, Shenzhen (CN); Wenfu Wu, Shanghai (CN); Qianghua Zhu, Beijing (CN); Chunsheng Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 17/526,339

(22) Filed: Nov. 15, 2021

(65) Prior Publication Data

US 2022/0078047 A1    Mar. 10, 2022

Related U.S. Application Data

(63) Continuation of application No. PCT/CN2020/090662, filed on May 15, 2020.

(30) Foreign Application Priority Data

May 17, 2019  (CN) .......................... 201910413600.3

(51) Int. Cl.
    *H04L 12/46*    (2006.01)
    *H04W 76/10*    (2018.01)

(52) U.S. Cl.
    CPC ...... *H04L 12/4641* (2013.01); *H04L 12/4633* (2013.01); *H04W 76/10* (2018.02)

(58) Field of Classification Search
    CPC ........... H04L 12/4641; H04L 12/4633; H04W 76/10; H04W 4/08
    See application file for complete search history.

(56) References Cited

U.S. PATENT DOCUMENTS

2017/0303259 A1   10/2017 Lee et al.
2018/0173557 A1    6/2018 Nakil et al.
(Continued)

FOREIGN PATENT DOCUMENTS

CN    102333028 A    1/2012
CN    102946354 A    2/2013
(Continued)

OTHER PUBLICATIONS

Huawei et al.,"Support for unicast traffic forwarding within a 5G VN group",3GPP TSG-SA WG2 Meeting #133 S2-1905682,Reno, Nevada, USA, May 13-7, 2019,total 9 pages.
(Continued)

*Primary Examiner* — Luat Phung
(74) *Attorney, Agent, or Firm* — Rimon PC

(57) ABSTRACT

Embodiments of this application provide a device and a system of a virtual network service across session management network elements. A group session management network element obtains tunnel information of a first user plane network element serving a first terminal device belonging to a first virtual network group, sends a first message to a second session management network element, where the first message includes an identifier of the first terminal device, an identifier of the first virtual network group, and the tunnel information of the first user plane network element for configuring a first forwarding rule on a second user plane network element, and the first forwarding rule is used by the second user plane network element to send a first data packet to the first user plane network element when one terminal device belonging to the first virtual network group sends the first data packet to the first terminal device.

19 Claims, 8 Drawing Sheets

(56) References Cited

U.S. PATENT DOCUMENTS

| | | |
|---|---|---|
| 2018/0270888 A1 | 9/2018 | Faccin |
| 2020/0120022 A1* | 4/2020 | Stammers ............ H04L 12/4633 |
| 2020/0351984 A1* | 11/2020 | Talebi Fard .......... H04W 72/30 |
| 2022/0150166 A1* | 5/2022 | Yang ....................... H04L 45/74 |
| 2022/0191810 A1* | 6/2022 | Tang ..................... H04L 5/0092 |

FOREIGN PATENT DOCUMENTS

| | | |
|---|---|---|
| CN | 104780066 B | 12/2017 |
| CN | 108243082 A | 7/2018 |
| CN | 108811011 A | 11/2018 |
| CN | 109218995 A | 1/2019 |
| CN | 109245984 A | 1/2019 |
| CN | 109314839 A | 2/2019 |
| CN | 109428945 A | 3/2019 |
| CN | 109565465 A | 4/2019 |
| CN | 109673026 A | 4/2019 |
| CN | 109699013 A | 4/2019 |
| CN | 111031080 A | 4/2020 |
| WO | 2018059514 A1 | 4/2018 |
| WO | 2019027742 A1 | 2/2019 |

OTHER PUBLICATIONS

K. Bogineni et al.,"Optimized Mobile User Plane Solutions for 5G;draft-bogineni-dmm-optimized-mobile-user-plane-00.txt",IETF 101 London,17th Mar. 23, 2018,total 18 pages.

3GPP TS 23.501 V16.0.2 (Apr. 2019);3rd Generation Partnership Project;Technical Specification Group Services and System Aspects;System Architecture for the 5G System;Stage 2(Release 16);total 317 pages.

Luo Zhuohong,"Research on 5G Wireless Network Virtualization",Telecom World, 2019 Issue 03,with an English abstract,total 3 pages.

3GPP TR 23.734 V16.1.0 (Mar. 2019, 3rd Generation Partnership Project; Technical Specification Group Services and System Aspects; Study on enhancement of 5G System (5GS) for vertical and Local Area Network (LAN) services (Release 16), 111 pages.

* cited by examiner

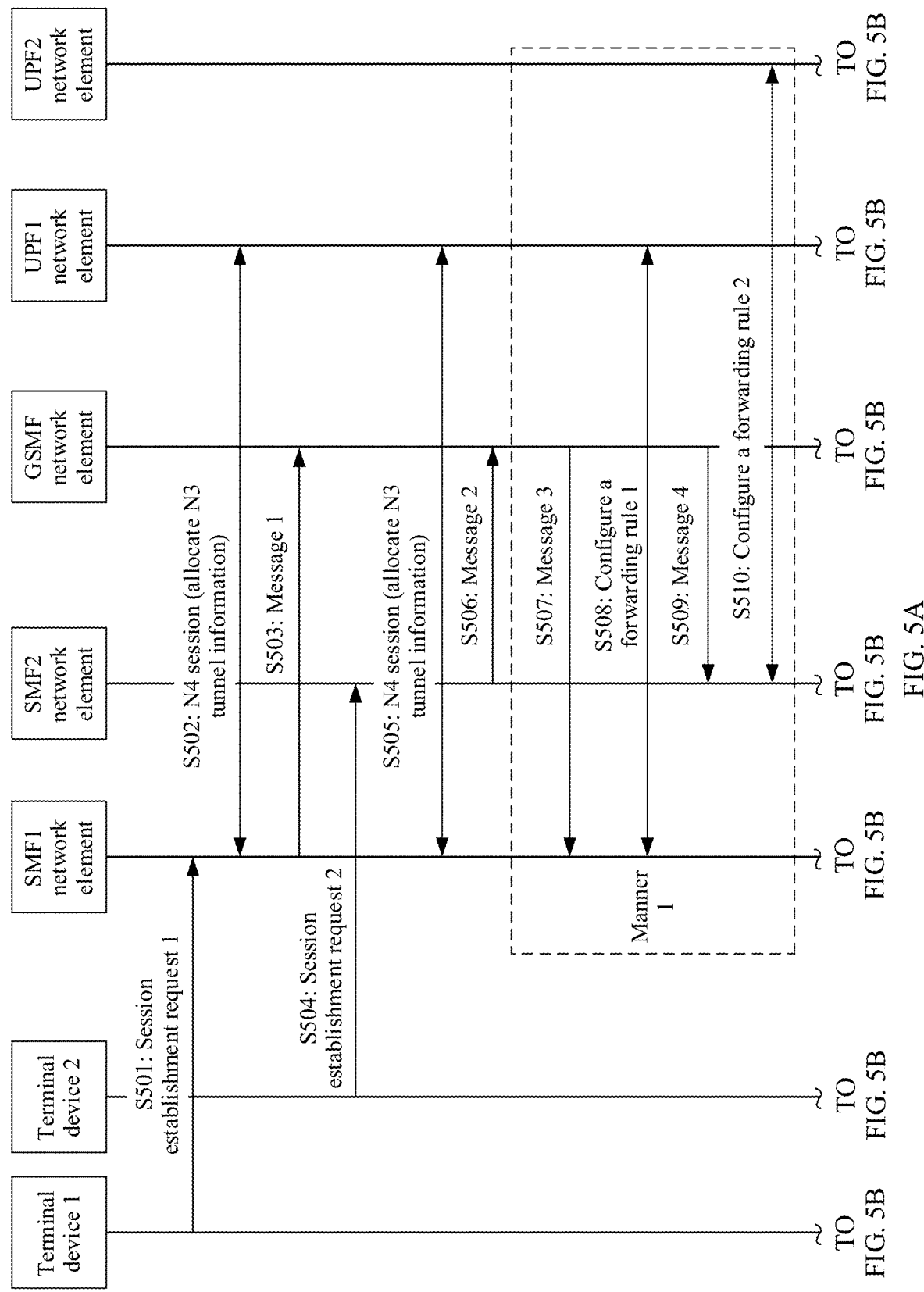

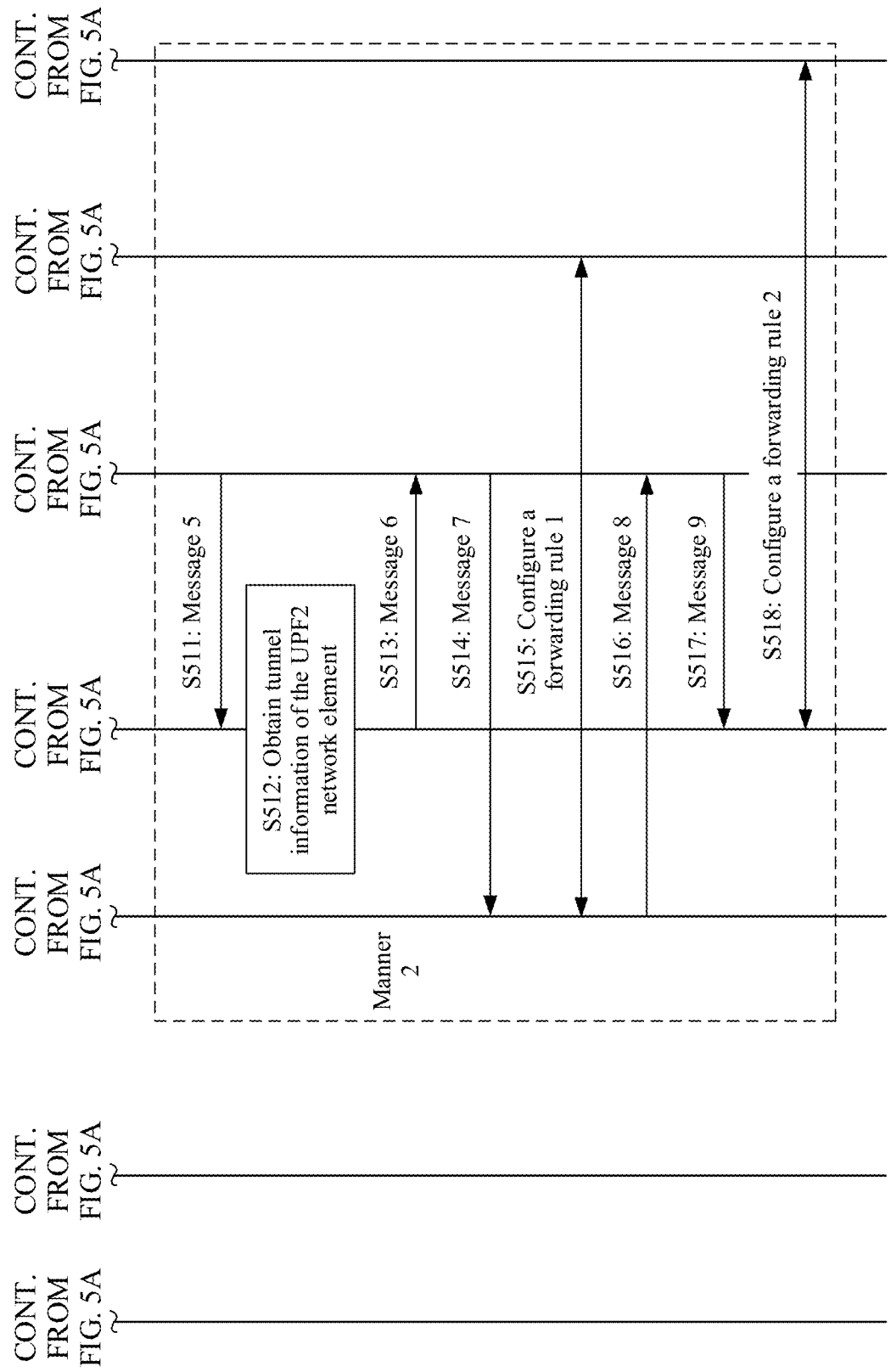

VIRTUAL NETWORK COMMUNICATION METHOD, DEVICE, AND SYSTEM

CROSS-REFERENCE TO RELATED APPLICATIONS

This application is a continuation of International Application No. PCT/CN2020/090662, filed on May 15, 2020, which claims priority to Chinese Patent Application No. 201910413600.3, filed on May 17, 2019. The disclosures of the aforementioned applications are hereby incorporated by reference in their entireties.

TECHNICAL FIELD

This application relates to the communication field, and in particular, to a virtual network communication method, a device, and a system.

BACKGROUND

A fifth generation (5G) virtual network (5GVN) (which may also be referred to as a 5G local area network (5GLAN)) service is a service provided by a current 5G network, and is mainly applied to home communication, enterprise office, factory manufacturing, internet of vehicles, power grid reconstruction, public security organs, and the like. The service can provide private communication of an internet protocol (IP) type or a non-IP type (such as an Ethernet type) for two or more terminal devices in a group of terminal devices. For example, a 5GVN group includes devices in a factory, and different devices may send Ethernet data packets to each other. Alternatively, a 5GVN group includes office devices (such as mobile phones, computers, or laptop computers) of employees in a department of an enterprise, and different office devices may send IP data packets to each other. If two terminal devices are not in a same 5GVN group, the two terminal devices cannot communicate with each other.

Currently, the 5GVN service provides point-to-point data transmission between terminal devices, and may cover a very wide range, for example, cross-city, cross-province, or cross-country. For example, the 5GVN service provides private communication for devices in office areas of a multinational enterprise that are located in different cities, provinces, or countries. In a conventional technology, if two terminal devices are relatively far away from each other, the 5G network needs to select different session management function (SMF) network elements for the two terminal devices to respectively manage sessions from the two terminal devices to the 5GVN service, and select different user plane function (UPF) network elements to respectively provide data transmission for the sessions of the two terminal devices.

However, currently, no solution is available to implement private communication of a virtual network service across session management network elements.

SUMMARY

Embodiments of this application provide a virtual network communication method, a device, and a system, to implement private communication of a virtual network service across session management network elements.

To achieve the foregoing objective, the following technical solutions are used in the embodiments of this application.

According to a first aspect, a virtual network communication method is provided. The method includes: A group session management network element obtains tunnel information of a first user plane network element serving a first terminal device belonging to a first virtual network group, where the first user plane network element is managed by a first session management network element. The group session management network element sends a first message to a second session management network element, where the first message includes an identifier of the first terminal device, an identifier of the first virtual network group, and the tunnel information of the first user plane network element; and the identifier of the first terminal device, the identifier of the first virtual network group, and the tunnel information of the first user plane network element are used to configure a first forwarding rule on a second user plane network element managed by the second session management network element, and the first forwarding rule is used by the second user plane network element to send a first data packet to the first user plane network element when a terminal device that belongs to the first virtual network group and that is served by the second user plane network element sends the first data packet to the first terminal device belonging to the first virtual network group. In this embodiment of this application, the group session management network element may configure the first forwarding rule on the second user plane network element through the second session management network element, and the first forwarding rule is used by the second user plane network element to send the first data packet to the first user plane network element when the terminal device that belongs to the first virtual network group and that is served by the second user plane network element sends the first data packet to the first terminal device belonging to the first virtual network group. Therefore, based on this solution, private communication of a virtual network service across session management network elements can be implemented.

In a possible design, the method further includes: In a process in which the first terminal device belonging to the first virtual network group establishes a session, the group session management network element receives a second message from the first session management network element, where the second message includes the identifier of the first terminal device and an identifier of the first session management network element. The group session management network element stores a mapping relationship between the identifier of the first terminal device and the identifier of the first session management network element. In other words, in the process in which the first terminal device belonging to the first virtual network group establishes the session, the first session management network element may report, to the group session management network element, the identifier of the first terminal device and the identifier of the first session management network element serving the first terminal device, so that the group session management network element can update stored topology information of the first virtual network group, to manage the topology information of the virtual network group together.

In a possible design, the second message further includes at least one of the identifier of the first virtual network group to which the first terminal device belongs and the tunnel information of the first user plane network element serving the first terminal device belonging to the first virtual network group. That the group session management network element stores a mapping relationship between the identifier of the first terminal device and the identifier of the first session management network element includes: The group session management network element stores a mapping relationship between the identifier of the first terminal device, the identifier of the first session management network element, and at least one of the identifier of the first virtual network group and the tunnel information of the first user plane network element. In other words, in the process in which the first terminal device belonging to the first virtual network group establishes the session, the first session management network element may report, to the group session management network element, at least one of the tunnel information of the first user plane network element serving the first terminal device and the identifier of the first virtual network group, so that the group session management network element can update stored topology information of the first virtual network group, to manage the topology information of the virtual network group together.

In a possible design, that a group session management network element obtains tunnel information of a first user plane network element serving a first terminal device belonging to a first virtual network group includes: When the mapping relationship includes the tunnel information of the first user plane network element, the group session management network element obtains the stored tunnel information of the first user plane network element serving the first terminal device belonging to the first virtual network group. In other words, in the process in which the first terminal device belonging to the first virtual network group establishes the session, the first session management network element may report, to the group session management network element, the tunnel information of the first user plane network element serving the first terminal device, so that the group session management network element may store the tunnel information of the first user plane network element. Further, when creating a forwarding rule on a user plane network element, the group session management network element may directly obtain the stored tunnel information of the first user plane network element serving the first terminal device belonging to the first virtual network group, thereby simplifying a forwarding rule creation procedure.

In a possible design, that a group session management network element obtains tunnel information of a first user plane network element serving a first terminal device belonging to a first virtual network group includes: When the mapping relationship does not include the tunnel information of the first user plane network element, the group session management network element sends a third message to the first session management network element, where the third message is used to request to establish a tunnel for the first terminal device belonging to the first virtual network group. The group session management network element receives the tunnel information that is of the first user plane network element serving the first terminal device belonging to the first virtual network group and that is from the first session management network element. In other words, in this embodiment of this application, the group session management network element may obtain, by requesting the first session management network element to establish the tunnel, the tunnel information of the first user plane network element that serves the first terminal device belonging to the first virtual network group.

In a possible design, the method further includes: The group session management network element receives tunnel information that is of the second user plane network element serving a second terminal device belonging to the first virtual network group and that is from the second session management network element. The group session management network element sends a fourth message to the first session management network element, where the fourth message includes an identifier of the second terminal device, the identifier of the first virtual network group, and the tunnel information of the second user plane network element; and the identifier of the second terminal device, the identifier of the first virtual network group, and the tunnel information of the second user plane network element are used to configure a second forwarding rule on the first user plane network element, and the second forwarding rule is used by the first user plane network element to send a second data packet to the second user plane network element when a terminal device that belongs to the first virtual network group and that is served by the first user plane network element sends the second data packet to the second terminal device belonging to the first virtual network group. Based on this solution, a corresponding forwarding rule may be configured on both the first user plane network element and the second user plane network element, to implement bidirectional communication between terminal devices.

In a possible design, before the group session management network element obtains the tunnel information of the first user plane network element, the method further includes: The group session management network element receives a fifth message from the second session management network element, where the fifth message is used to request the first forwarding rule. In other words, in this embodiment of this application, creation of a forwarding rule on a user plane network element may be dynamically triggered after the user plane network element receives a data packet, and the forwarding rule does not need to be created in a session establishment process, thereby simplifying a session establishment procedure.

According to a second aspect, a virtual network communication method is provided. The method includes: In a process in which a second terminal device belonging to a first virtual network group establishes a session, a second session management network element sends a first message to a group session management network element, where the first message includes an identifier of the second terminal device and an identifier of the second session management network element. The second session management network element receives a second message from the group session management network element, where the second message includes an identifier of a first terminal device belonging to the first virtual network group, an identifier of the first virtual network group, and tunnel information of a first user plane network element serving the first terminal device belonging to the first virtual network group, where the first user plane network element is managed by a first session management network element. The second session management network element configures, based on the identifier of the first terminal device, the identifier of the first virtual network group, and the tunnel information of the first user plane network element, a first forwarding rule on a second user plane network element managed by the second session management network element, where the first forwarding rule is used by the second user plane network element to send a first data packet to the first user plane network element when a terminal device that belongs to the first virtual network group and that is served by the second user plane network element sends the first data packet to the first terminal device belonging to the first virtual network group. In this embodiment of this application, the group session management network element may configure the first forwarding rule on the second user plane network element through the second session management network element, and the first forwarding rule is used by the second user plane network element to send the first data packet to the first user plane network element when the terminal device that belongs to the first virtual network group and that is served by the second user plane network element sends the first data packet to the first terminal device belonging to the first virtual network group. Therefore, based on this solution, private communication of a virtual network service across session management network elements can be implemented.

In a possible design, before the second session management network element receives the second message from the group session management network element, the method further includes: The second session management network element receives a third message from the second user plane network element, where the third message is used to request the first forwarding rule. The second session management network element determines that the first forwarding rule does not exist on the second session management network element. The second session management network element sends a fourth message to the group session management network element, where the fourth message is used to request the first forwarding rule. In other words, in this embodiment of this application, creation of a forwarding rule on a user plane network element may be dynamically triggered after the user plane network element receives a data packet, and the forwarding rule does not need to be created in a session establishment process, thereby simplifying a session establishment procedure.

In a possible design, the first message further includes the identifier of the first virtual network group to which the second terminal device belongs.

In a possible design, the first message further includes tunnel information of the second user plane network element serving the second terminal device belonging to the first virtual network group. In other words, in the process in which the second terminal device belonging to the first virtual network group establishes the session, the second session management network element may report, to the group session management network element, the tunnel information of the second user plane network element serving the second terminal device, so that the group session management network element may store the tunnel information of the second user plane network element. Further, when creating a forwarding rule on a user plane network element, the group session management network element may directly obtain the stored tunnel information of the second user plane network element serving the second terminal device belonging to the first virtual network group, thereby simplifying a forwarding rule creation procedure.

In a possible design, before the second session management network element receives the second message from the group session management network element, the method further includes: The second session management network element receives a fifth message from the group session management network element, where the fifth message is used to request to establish a tunnel for the second terminal device belonging to the first virtual network group. The second session management network element sends, to the group session management network element, the tunnel information of the second user plane network element serving the second terminal device belonging to the first virtual network group. Based on this solution, the group session management network element may obtain the tunnel information of the second user plane network element serving the second terminal device belonging to the first virtual network group. Further, the group session manage-ment network element may send the second message that includes the identifier of the first terminal device belonging to the first virtual network group, the identifier of the first virtual network group, and the tunnel information of the first user plane network element serving the first terminal device belonging to the first virtual network group to the second session management network element. Therefore, the first forwarding rule is configured on the second user plane network element.

According to a third aspect, a communication apparatus is provided, to implement the foregoing methods. The communication apparatus may be the group session management network element in the first aspect, or an apparatus including the group session management network element. Alternatively, the communication apparatus may be the second session management network element in the second aspect, or an apparatus including the second session management network element. The communication apparatus includes a corresponding module, unit, or means for implementing the foregoing methods. The module, unit, or means may be implemented by using hardware or software, or implemented by using hardware to execute corresponding software. The hardware or the software includes one or more modules or units corresponding to the functions.

According to a fourth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the group session management network element in the first aspect, or an apparatus including the group session management network element. Alternatively, the communication apparatus may be the second session management network element in the second aspect, or an apparatus including the second session management network element.

According to a fifth aspect, a communication apparatus is provided, and includes a processor. The processor is configured to: after being coupled to a memory and reading instructions in the memory, perform, according to the instructions, the method according to any one of the foregoing aspects. The communication apparatus may be the group session management network element in the first aspect, or an apparatus including the group session management network element. Alternatively, the communication apparatus may be the second session management network element in the second aspect, or an apparatus including the second session management network element.

According to a sixth aspect, a computer-readable storage medium is provided. The computer-readable storage medium stores instructions. When the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

According to an eighth aspect, a communication apparatus (for example, the communication apparatus may be a chip or a chip system) is provided. The communication apparatus includes a processor, configured to implement the functions according to any one of the foregoing aspects. In a possible design, the communication apparatus further includes a memory. The memory is configured to store necessary program instructions and data. When the communication apparatus is the chip system, the communication apparatus may include a chip, or may include a chip and another discrete component.

For technical effects brought by any design manner of the third aspect to the eighth aspect, refer to the technical effects brought by different design manners of the first aspect or the second aspect. Details are not described herein again.

According to a ninth aspect, a virtual network communication method is provided. The method includes: A group session management network element obtains tunnel information of a first user plane network element serving a first terminal device belonging to a first virtual network group, where the first user plane network element is managed by a first session management network element. The group session management network element sends a first message to a second session management network element, where the first message includes an identifier of the first terminal device, an identifier of the first virtual network group, and the tunnel information of the first user plane network element. The second session management network element receives the first message from the group session management network element, and configures, based on the identifier of the first terminal device, the identifier of the first virtual network group, and the tunnel information of the first user plane network element, a first forwarding rule on a second user plane network element managed by the second session management network element, where the first forwarding rule is used by the second user plane network element to send a first data packet to the first user plane network element when a terminal device that belongs to the first virtual network group and that is served by the second user plane network element sends the first data packet to the first terminal device belonging to the first virtual network group.

In a possible design, the method further includes: In a process in which the first terminal device belonging to the first virtual network group establishes a session, the first session management network element sends a second message to the group session management network element, where the second message includes the identifier of the first terminal device and an identifier of the first session management network element. The group session management network element receives the second message from the first session management network element, and stores a mapping relationship between the identifier of the first terminal device and the identifier of the first session management network element.

In a possible design, the second message further includes at least one of the identifier of the first virtual network group to which the first terminal device belongs and the tunnel information of the first user plane network element serving the first terminal device belonging to the first virtual network group. That the group session management network element stores a mapping relationship between the identifier of the first terminal device and the identifier of the first session management network element includes: The group session management network element stores a mapping relationship between the identifier of the first terminal device, the identifier of the first session management network element, and at least one of the identifier of the first virtual network group and the tunnel information of the first user plane network element.

In a possible design, that a group session management network element obtains tunnel information of a first user plane network element serving a first terminal device belonging to a first virtual network group includes: When the mapping relationship includes the tunnel information of the first user plane network element, the group session management network element obtains the stored tunnel information of the first user plane network element serving the first terminal device belonging to the first virtual network group.

In a possible design, that a group session management network element obtains tunnel information of a first user plane network element serving a first terminal device belonging to a first virtual network group includes: When the mapping relationship does not include the tunnel information of the first user plane network element, the group session management network element sends a third message to the first session management network element, where the third message is used to request to establish a tunnel for the first terminal device belonging to the first virtual network group. The group session management network element receives the tunnel information that is of the first user plane network element serving the first terminal device belonging to the first virtual network group and that is from the first session management network element.

In a possible design, the method further includes: The second session management network element sends tunnel information of the second user plane network element serving a second terminal device belonging to the first virtual network group to the group session management network element. The group session management network element receives the tunnel information that is of the second user plane network element serving the second terminal device belonging to the first virtual network group and that is from the second session management network element. The group session management network element sends a fourth message to the first session management network element, where the fourth message includes an identifier of the second terminal device, the identifier of the first virtual network group, and the tunnel information of the second user plane network element. The first session management network element receives the fourth message from the group session management network element, and configures a second forwarding rule on the first user plane network element based on the identifier of the second terminal device, the identifier of the first virtual network group, and the tunnel information of the second user plane network element, where the second forwarding rule is used by the first user plane network element to send a second data packet to the second user plane network element when a terminal device that belongs to the first virtual network group and that is served by the first user plane network element sends the second data packet to the second terminal device belonging to the first virtual network group.

In a possible design, the method further includes: The second session management network element receives a fifth message from the second user plane network element, where the fifth message is used to request the first forwarding rule. After determining that the first forwarding rule does not exist on the second session management network element, the second session management network element sends a sixth message to the group session management network element, where the sixth message is used to request the first forwarding rule. Before obtaining the tunnel information of the first user plane network element, the group session management network element receives the sixth message from the second session management network element.

For technical effects brought by any design manner of the ninth aspect, refer to technical effects brought by different design manners of the first aspect or the second aspect. Details are not described herein again.

According to a tenth aspect, a virtual network communication method is provided. The method includes: A group session management network element sends a first message to a second session management network element, where the first message is used to request to establish a tunnel for a second terminal device belonging to a first virtual network group. After receiving the first message from the group session management network element, and obtaining tunnel information of a second user plane network element serving the second terminal device, the second session management network element sends the tunnel information of the second user plane network element, an identifier of the first virtual network group, and an identifier of the second terminal device to a first session management network element, where the second user plane network element is managed by the second session management network element. The first session management network element receives the tunnel information of the second user plane network element, the identifier of the first virtual network group, and the identifier of the second terminal device from the second session management network element, and configures, based on the identifier of the first virtual network group, the tunnel information of the second user plane network element, and the identifier of the second terminal device, a first forwarding rule on a first user plane network element managed by the first session management network element, where the first forwarding rule is used by the first user plane network element to send a data packet to the second user plane network element when a terminal device that belongs to the first virtual network group and that is served by the first user plane network element sends the data packet to the second terminal device. Based on this solution, the tunnel information of the user plane network element is directly exchanged between the first session management network element and the second session management network element, so that a tunnel establishment procedure and a forwarding rule establishment procedure can be simplified.

According to an eleventh aspect, a communication system is provided. The communication system includes a group session management network element and a second session management network element. The group session management network element is configured to obtain tunnel information of a first user plane network element serving a first terminal device belonging to a first virtual network group, where the first user plane network element is managed by a first session management network element. The group session management network element is further configured to send a first message to the second session management network element, where the first message includes an identifier of the first terminal device, an identifier of the first virtual network group, and the tunnel information of the first user plane network element. The second session management network element is configured to: receive the first message from the group session management network element, and configure, based on the identifier of the first terminal device, the identifier of the first virtual network group, and the tunnel information of the first user plane network element, a first forwarding rule on a second user plane network element managed by the second session management network element, where the first forwarding rule is used by the second user plane network element to send a first data packet to the first user plane network element when a terminal device that belongs to the first virtual network group and that is served by the second user plane network element sends the first data packet to the first terminal device belonging to the first virtual network group.

In a possible design, the communication system further includes the first session management network element. The first session management network element is configured to: in a process in which the first terminal device belonging to the first virtual network group establishes a session, send a second message to the group session management network element, where the second message includes the identifier of the first terminal device and an identifier of the first session management network element. The group session management network element is further configured to: receive the second message from the first session management network element, and store a mapping relationship between the identifier of the first terminal device and the identifier of the first session management network element.

In a possible design, the second message further includes at least one of the identifier of the first virtual network group to which the first terminal device belongs and the tunnel information of the first user plane network element serving the first terminal device belonging to the first virtual network group. That the group session management network element is further configured to store a mapping relationship between the identifier of the first terminal device and the identifier of the first session management network element includes: The group session management network element is further configured to store a mapping relationship between the identifier of the first terminal device, the identifier of the first session management network element, and at least one of the identifier of the first virtual network group and the tunnel information of the first user plane network element.

In a possible design, that the group session management network element is configured to obtain tunnel information of a first user plane network element serving a first terminal device belonging to a first virtual network group includes: The group session management network element is configured to: when the mapping relationship includes the tunnel information of the first user plane network element, obtain the stored tunnel information of the first user plane network element serving the first terminal device belonging to the first virtual network group.

In a possible design, that the group session management network element is configured to obtain tunnel information of a first user plane network element serving a first terminal device belonging to a first virtual network group includes: The group session management network element is configured to: when the mapping relationship does not include the tunnel information of the first user plane network element, send a third message to the first session management network element, where the third message is used to request to establish a tunnel for the first terminal device belonging to the first virtual network group. The group session management network element is further configured to receive the tunnel information that is of the first user plane network element serving the first terminal device belonging to the first virtual network group and that is from the first session management network element.

In a possible design, the second session management network element is further configured to send, to the group session management network element, tunnel information of the second user plane network element serving a second terminal device belonging to the first virtual network group. The group session management network element is further configured to receive the tunnel information that is of the second user plane network element serving the second terminal device belonging to the first virtual network group and that is from the second session management network element. The group session management network element is further configured to send a fourth message to the first session management network element, where the fourth message includes an identifier of the second terminal device, the identifier of the first virtual network group, and the tunnel information of the second user plane network element. The first session management network element is further configured to: receive the fourth message from the group session management network element, and configure a second forwarding rule on the first user plane network element based on the identifier of the second terminal device, the identifier of the first virtual network group, and the tunnel information of the second user plane network element, where the second forwarding rule is used by the first user plane network element to send a second data packet to the second user plane network element when a terminal device that belongs to the first virtual network group and that is served by the first user plane network element sends the second data packet to the second terminal device belonging to the first virtual network group.

In a possible design, the second session management network element is further configured to receive a fifth message from the second user plane network element, where the fifth message is used to request the first forwarding rule. The second session management network element is further configured to: after determining that the first forwarding rule does not exist on the second session management network element, send a sixth message to the group session management network element, where the sixth message is used to request the first forwarding rule. The group session management network element is further configured to: before obtaining the tunnel information of the first user plane network element, receive the sixth message from the second session management network element.

For technical effects brought by any design manner of the eleventh aspect, refer to technical effects brought by different design manners of the first aspect or the second aspect. Details are not described herein again.

According to a twelfth aspect, a communication system is provided. The communication system includes a group session management network element, a first session management network element, and a second session management network element. The group session management network element is configured to send a first message to the second session management network element, where the first message is used to request to establish a tunnel for a second terminal device belonging to a first virtual network group. After receiving the first message from the group session management network element, and obtaining tunnel information of a second user plane network element serving the second terminal device, the second session management network element is configured to send the tunnel information of the second user plane network element, an identifier of the first virtual network group, and an identifier of the second terminal device to the first session management network element, where the second user plane network element is managed by the second session management network element. The first session management network element is configured to: receive the tunnel information of the second user plane network element, the identifier of the first virtual network group, and the identifier of the second terminal device from the second session management network element, and configure, based on the identifier of the first virtual network group, the tunnel information of the second user plane network element, and the identifier of the second terminal device, a first forwarding rule on a first user plane network element managed by the first session management network element, where the first forwarding rule is used by the first user plane network element to send a data packet to the second user plane network element when a first terminal device that belongs to the first virtual network group and that is served by the first user plane network element sends the data packet to the second terminal device.

For technical effects brought by the twelfth aspect, refer to the technical effects brought by the tenth aspect. Details are not described herein again.

BRIEF DESCRIPTION OF DRAWINGS

FIG. 5A and FIG. 5B are a schematic diagram of a flowchart of a virtual network communication method according to an embodiment of this application;

DESCRIPTION OF EMBODIMENTS

The following describes the technical solutions in embodiments of this application with reference to the accompanying drawings in the embodiments of this application. In the descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items" or a similar expression thereof means any combination of these items, including any combination of singular items or plural items. For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference. In addition, in the embodiments of this application, a word such as "example" or "for example" is used to represent giving an example, an illustration, or a description. Any embodiment or design scheme described as an "example" or "for example" in the embodiments of this application should not be explained as being more preferred or having more advantageous than another embodiment or design scheme. Exactly, use of the word "example", "for example", or the like is intended to present a relative concept in a specific manner for ease of understanding.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 1:
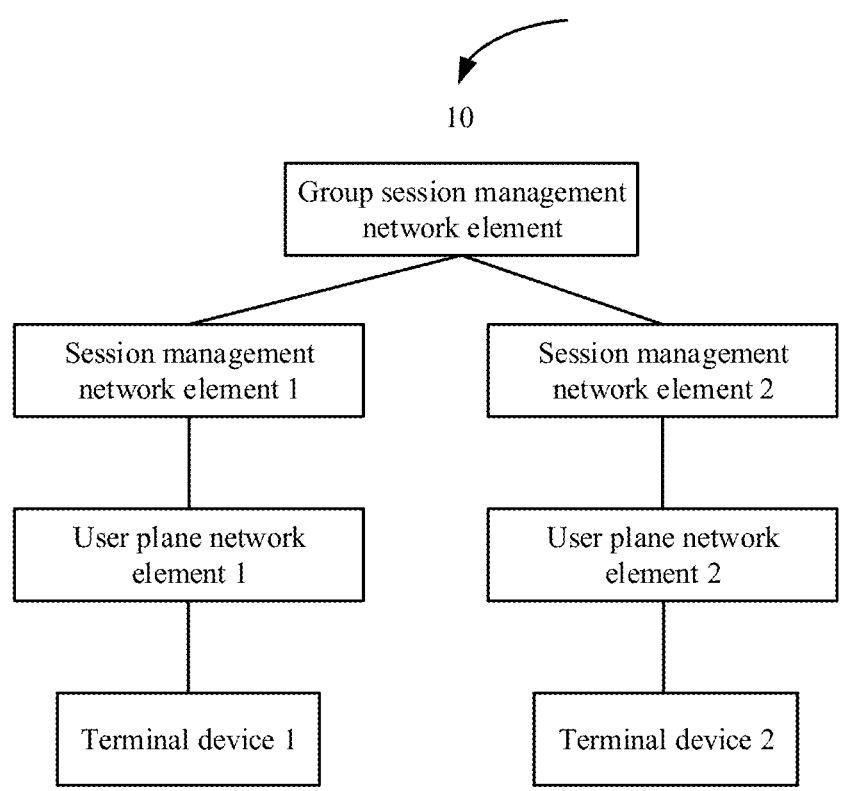
FIG. 1 is a schematic architectural diagram of a communication system according to an embodiment of this application.

FIG. 1 shows a communication system 10 according to an embodiment of this application. The communication system 10 includes a group session management network element, a session management network element 1 and a session management network element 2 that communicate with the group session management network element, a user plane network element 1 managed by the session management network element 1, a user plane network element 2 managed by the session management network element 2, a terminal device 1 that belongs to a first virtual network group and that is served by the user plane network element 1, and a terminal device 2 that belongs to the first virtual network group and that is served by the user plane network element 2.

It should be noted that FIG. 1 shows only two session management network elements (namely, the session management network element 1 and the session management network element 2) as an example. Certainly, there may be other session management network elements, for example, a session management network element 3 or a session management network element 4, that communicates with the group session management network element. This is not specifically limited in this embodiment of this application.

It should be noted that FIG. 1 is described by using merely an example in which one session management network element communicates with one user plane network element. For example, the session management network element 1 communicates with the user plane network element 1, and the session management network element 2 communicates with the user plane network element 2. Certainly, one session management network element may communicate with a plurality of user plane network elements. For example, the session management network element 1 may also communicate with a user plane network element 3 or a user plane network element 4. The session management network element 2 may also communicate with a user plane network element 5. This is not specifically limited in this embodiment of this application.

It should be noted that FIG. 1 is described by using merely an example in which one user plane network element serves one terminal device belonging to the first virtual network group. For example, the user plane network element 1 serves the terminal device 1 belonging to the first virtual network group, the user plane network element 2 serves the terminal device belonging to the first virtual network group. Certainly, one user plane network element may serve a plurality of terminal devices belonging to the first virtual network group. For example, the user plane network element 1 may also serve a terminal device 3 belonging to the first virtual network group. In addition, one user plane network element may alternatively serve terminal devices belonging to a plurality of virtual network groups. For example, the user plane network element 1 may also serve a terminal device belonging to a second virtual network group. This is not specifically limited in this embodiment of this application.

It should be noted that the network elements shown in FIG. 1 may directly communicate with each other or communicate through forwarding by another device. This is not specifically limited in this embodiment of this application.

Optionally, the session management network element 1 in FIG. 1 may also be referred to as a first session management network element, the session management network element 2 in FIG. 1 may also be referred to as a second session management network element, the user plane network element 1 in FIG. 1 may also be referred to as a first user plane network element, the user plane network element 2 in FIG. 1 may also be referred to as a second user plane network element, the terminal device 1 in FIG. 1 may also be referred to as a first terminal device, and the terminal device 2 in FIG. 1 may also be referred to as a second terminal device. The session management network element 2 in FIG. 1 may also be referred to as a first session management network element, the session management network element 1 in FIG. 1 may also be referred to as a second session management network element, the user plane network element 2 in FIG. 1 may also be referred to as a first user plane network element, the user plane network element 1 in FIG. 1 may also be referred to as a second user plane network element, the terminal device 2 in FIG. 1 may also be referred to as a first terminal device, and the terminal device 1 in FIG. 1 may also be referred to as a second terminal device. This is not specifically limited in this embodiment of this application.

For information about a method for performing virtual network communication based on the communication system shown in FIG. 1, refer to subsequent method embodiments. Details are not described herein.

Optionally, the communication system shown in FIG. 1 may be used in a current 5G network or another future network. This is not specifically limited in this embodiment of this application.

Figure 2:
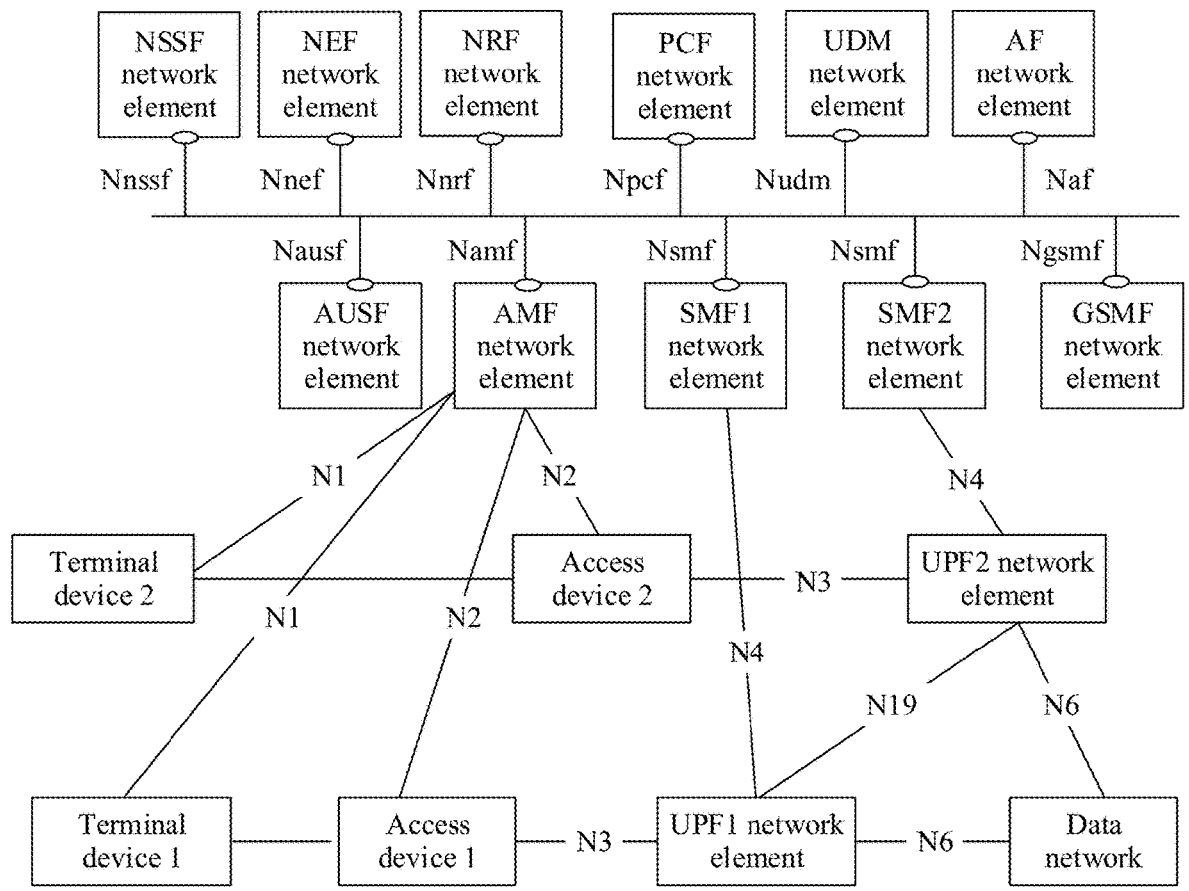
FIG. 2 is a schematic diagram of application of a communication system in a 5G network according to an embodiment of this application.

For example, as shown in FIG. 2, if the communication system shown in FIG. 1 is used in the current 5G network, a network element or an entity corresponding to the session management network element 1 in FIG. 1 may be an SMF1 network element in a 5G network architecture; a network element or an entity corresponding to the session management network element 2 in FIG. 1 may be an SMF2 network element in the 5G network architecture; a network element or an entity corresponding to the user plane network element 1 in FIG. 1 may be a UPF1 network element in the 5G network architecture; a network element or an entity corresponding to the user plane network element 2 in FIG. 1 may be a UPF2 network element in the 5G network architecture; a network element or an entity corresponding to the group session management network element in FIG. 1 may be a group SMF (GSMF) in the 5G network architecture. A virtual network may be a 5GVN. In addition, in expressions, the 5GVN may also be referred to as a 5GLAN, a LAN, a LAN-type service, a LAN-VN, a 5GLAN-type service, a 5GLAN-VN, a 5GLAN group, a LAN group, or the like. A GSMF network element may also be referred to as a 5GLAN SMF (LSMF) network element, a 5GVN SMF network element, a 5GLAN path management function (PMF) network element, a 5GVN PMF network element, a 5GLAN address resolution function (ARF) network element, a 5GVN ARF network element, a 5GLAN group controller/control function (GCF) network element, a 5GVN GCF network element, a 5GLAN configuration controller/control function (CCF) network element, a 5GVN CCF network element, a 5GLAN-type service management function (5LSMF) network element, a 5GVN-type service management function (5VSMF) network element, a 5GLAN virtual network management function (5LVMF) network element, a 5GVN management function network element, a 5GLAN virtual network controller (5LVC), a 5GVN controller, a 5GLAN controller (5LC), a 5GLAN-type service controller (5LSC), or the like. Names of the 5GVN and the GSMF network element are not specifically limited in this embodiment of this application.

In this embodiment of this application, the GSMF network element is configured to manage a topology structure of the 5GVN. For example, the GSMF network element may dynamically add an identifier of an SMF network element, an identifier of a UPF network element (optional), tunnel information of the UPF network element (optional), and an identifier of a terminal device to the topology structure of the 5GVN at a position where the terminal device accesses the 5GVN. Alternatively, the GSMF network element may dynamically update an identifier of an SMF network element, an identifier of a UPF network element (optional), or tunnel information of the UPF network element (optional) based on a movement status of a terminal device. Alternatively, the GSMF network element may dynamically update a forwarding rule on a UPF network element in the 5GVN based on an address change of a terminal device in the 5GVN, for example, a new address is added or an old address is deleted, to ensure that private communication, namely, point-to-point data transmission between terminal devices, in the 5GVN can be implemented. Alternatively, when the GSMF network element detects that an SMF network element serving a terminal device is different from an SMF network element serving another terminal device, the GSMF network element updates forwarding rules on corresponding UPF network elements by negotiating with the two SMF network elements. Optionally, if a UPF network element provides a 5GVN service for a terminal device for the first time, a tunnel (which may also be referred to as a forwarding path) between the UPF network element and another UPF network element needs to be established when a forwarding rule on the corresponding UPF network element is updated.

Optionally, in this embodiment of this application, the tunnel information of the UPF network element includes tunnel information or path information of a next-generation (NG) network 19 interface (N19 for short) of the UPF network element. N19 is a name of an interface between UPF network elements, or may also be another interface name, for example, N9. This is not limited in the present invention. A tunnel or a forwarding path corresponding to the tunnel information of the UPF network element may be constructed by using a virtual local area network (VLAN), a virtual extensible local area network (VxLAN), a general packet radio service (GPRS) tunneling protocol-user plane (GTP-U), a generic routing encapsulation (GRE) protocol, or an IP tunnel. The foregoing construction manner may be dynamic, or may be preconfigured in a network. This is not specifically limited in this embodiment of this application. Corresponding tunnel information varies according to different construction manners. For example, when the VLAN is used for construction, the tunnel information may be a UPF ID, a UPF ID+a virtual local area network identifier (VLAN ID, VID), or media access control (MAC)+a VID. Alternatively, for example, when the VxLAN is used for construction, the tunnel information may be a UPF ID, a UPF ID+a VID, an IP address+a VID, or an IP address+a port number (port)+a VID. Alternatively, for example, when the GTP-U is used for construction, the tunnel information may be a UPF ID, a UPF ID+a tunnel endpoint identifier (TEID), an IP address+a TEID, or an IP address+a port+a TEID. Alternatively, for example, when the GRE is used for construction, the tunnel information may be a UPF ID, a UPF ID+a key (key), an IP address+a key, or an IP address+a port+a key. Alternatively, when the IP tunnel is used for construction, the tunnel information may be a UPF ID, an IP address, or an IP address+a port. If the tunnel information includes the UPF ID, the UPF ID may be a MAC address or an IP address, or an IP address+a port, or the SMF network element or the UPF network element may determine a corresponding MAC address or IP address, or an IP address+a port based on the UPF ID. A general description is provided herein, and details are not described below again.

In addition, as shown in FIG. 2, the current 5G network may further include an access device 1, an access device 2, an access and mobility management function (AMF) network element, an authentication server function (AUSF) network element, a network slice selection function (NSSF) network element, a network exposure function (NEF) network element, a network repository function (NRF) network element, a policy control function (PCF) network element, a unified data management (UDM) network element, an application function (AF) network element, and the like. This is not specifically limited in this embodiment of this application.

Optionally, the GSMF network element in this embodiment of this application may be integrated into an existing network element, for example, integrated into the UDM or a unified data repository (UDR) network element. This is not specifically limited in this embodiment of this application.

As shown in FIG. 2, a terminal device 1 accesses the 5G network through the access device 1, and the terminal device 1 communicates with an AMF network element through an N1 interface (N1 for short). A terminal device 2 accesses the 5G network by using the access device 2, and the terminal 2 communicates with the AMF network element through N1. The access device 1 or the access device 2 communicates with the AMF network element through an N2 interface (N2 for short). The access device 1 communicates with the UPF1 network element through an N3 interface (N3 for short). The access device 2 communicates with the UPF2 network element through N3. The SMF1 network element communicates with the UPF1 network element through an N4 interface (N4 for short). The SMF2 network element communicates with the UPF2 network element through N4. The UPF1 network element communicates with the UPF2 network element through the N19 interface (N19 for short), or the UPF1 network element or the UPF2 network element accesses a data network through an N6 interface (N6 for short). In addition, control plane network elements, for example, the AUSF network element, the AMF network element, the SMF network element (including the SMF1 network element and the SMF2 network element), the NSSF network element, the NEF network element, the NRF network element, the PCF network element, the UDM network element, the AF network element, or the GSMF network element shown in FIG. 2, may also interact with each other through a service-oriented interface. For example, a service-oriented interface provided by the AUSF network element for external connection may be Nausf, a service-oriented interface provided by the AMF network element for external connection may be Namf; a service-oriented interface provided by the SMF network element for external connection may be Nsmf, a service-oriented interface provided by the NSSF network element for external connection may be Nnssf, a service-oriented interface provided by the NEF network element for external connection may be Nnef; a service-oriented interface provided by the NRF network element for external connection may be Nnrf; a service-oriented interface provided by the PCF network element for external connection may be Npcf, a service-oriented interface provided by the UDM network element for external connection may be Nudm; a service-oriented interface provided by the AF network element for external connection may be Naf; a service-oriented interface provided by the GSMF network element for external connection may be Ngsmf. For related descriptions, refer to a diagram of a 5G system architecture in the 23501 standard. Details are not described herein.

Figure 3:
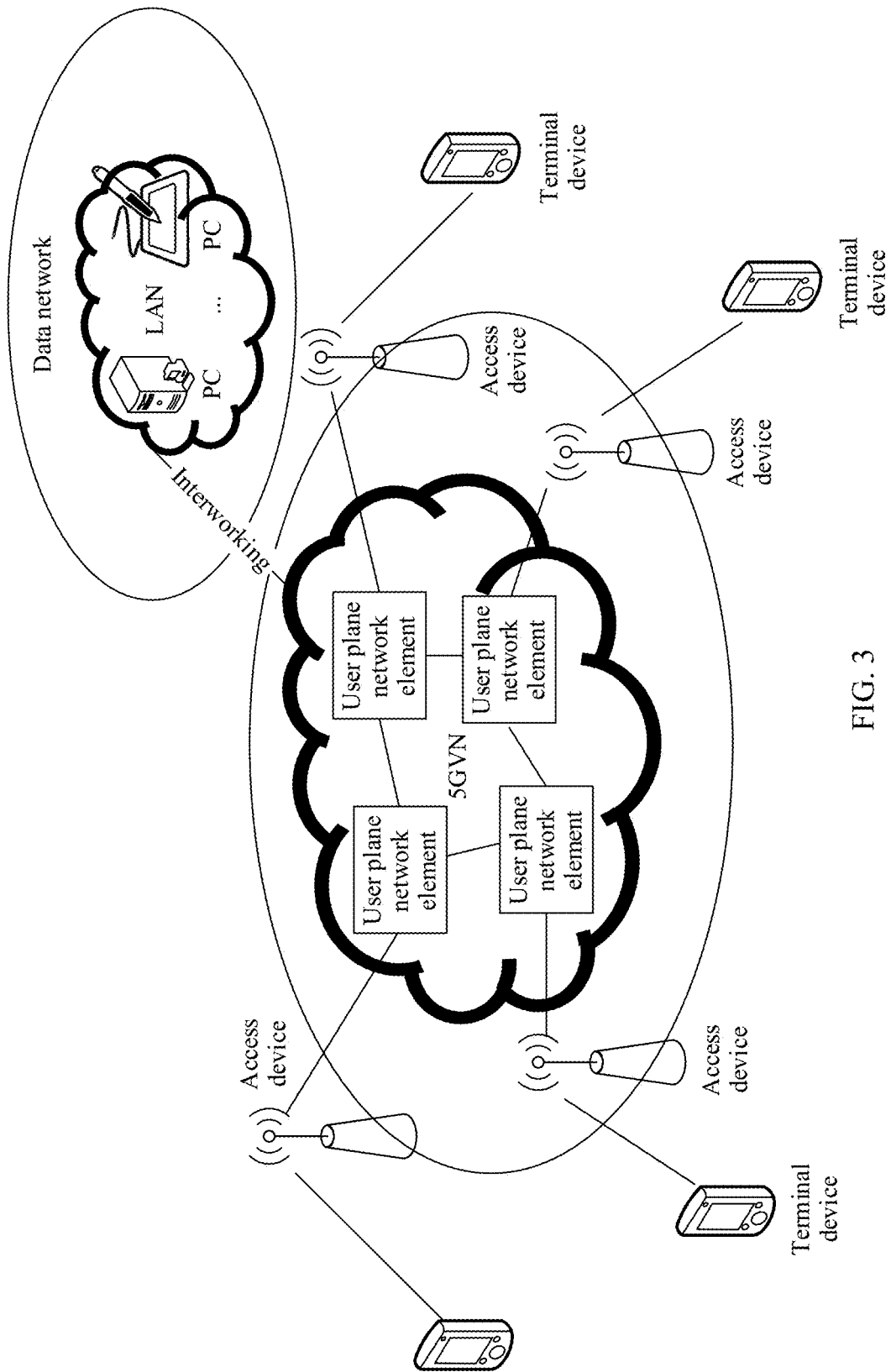
FIG. 3 is a schematic diagram of a user plane architecture of an existing 5GVN service.

FIG. 3 is a schematic diagram of a user plane architecture of an existing 5GVN service. A terminal device establishes a session to a UPF network element that provides a 5GVN service, to access the UPF network element that provides the 5GVN service. As described above, the UPF network element that provides the 5GVN service may communicate with an existing LAN in a data network through N6, for example, communicate with a personal computer (personal computer, PC) in the LAN. Alternatively, the UPF network element that provides the 5GVN service may associate sessions of different terminal devices through an internal connection between UPF network elements, to implement private communication. This is not specifically limited in this embodiment of this application.

Optionally, the terminal device in this embodiment of this application may be a device such as a terminal or a chip that may be used in a terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in an LTE system, an NR system, or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal may be movable or fixed.

Optionally, the access device in the embodiments of this application is a device that accesses a core network. For example, the access device may be a base station, a broadband network gateway (BNG), an aggregation switch, or a non-3rd generation partnership project (3GPP) access device. The base station may include base stations in various forms, such as a macro base station, a micro base station (also referred to as a small cell), a relay station, and an access point.

Optionally, the group session management network element, the session management network element 1, or the session management network element 2 in FIG. 1 in this embodiment of this application may be implemented by one device, or may be jointly implemented by a plurality of devices, or may be a function module in one device. This is not specifically limited in this embodiment of this application. It may be understood that the foregoing functions may be network elements in a hardware device, or may be software functions running on special-purpose hardware, or may be virtualization functions instantiated on a platform (for example, a cloud platform).

Figure 4:
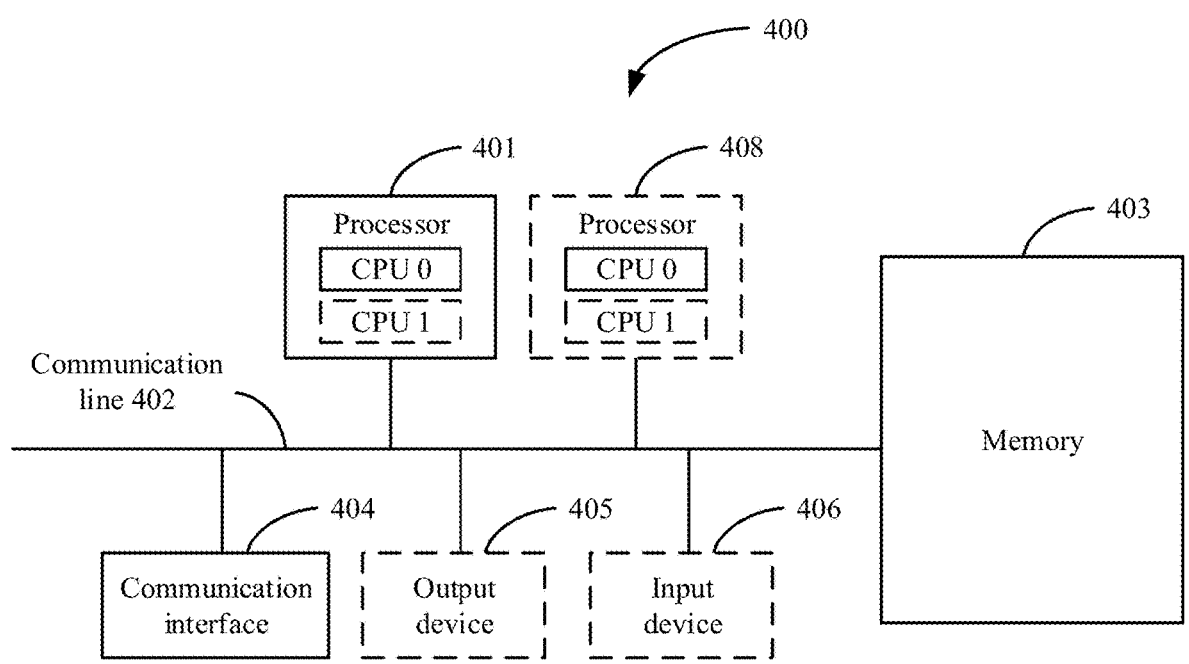
FIG. 4 is a schematic diagram of a hardware structure of a communication device according to an embodiment of this application.

For example, the group session management network element, the session management network element 1, or the session management network element 2 in FIG. 1 in this embodiment of this application may be implemented through a communication device in FIG. 4. FIG. 4 is a schematic diagram of a hardware structure of a communication device according to an embodiment of this application. The communication device 400 includes a processor 401, a communication line 402, a memory 403, and at least one communication interface (FIG. 4 is described by using merely an example in which the communication device 400 includes a communication interface 404).

The processor 401 may be a general-purpose central processing unit (CPU), a microprocessor, an application-specific integrated circuit (ASIC), or one or more integrated circuits configured to control program execution of the solutions of this application.

The communication line 402 may include a path for transmitting information between the foregoing components.

The communication interface 404 uses any transceiver-type apparatus, to communicate with another device or a communication network such as the Ethernet, a radio access network (RAN), or a wireless local area network (WLAN).

The memory 403 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 403 is not limited thereto. The memory may exist independently, and is connected to the processor through the communication line 402. The memory may alternatively be integrated with the processor.

The memory 403 is configured to store computer-executable instructions for executing the solutions in this application, and the processor 401 controls the execution. The processor 401 is configured to execute the computer-executable instructions stored in the memory 403, to implement a virtual network communication method provided in the following embodiments of this application.

Optionally, the computer-executable instructions in this embodiment of this application may also be referred to as application program code. This is not specifically limited in this embodiment of this application.

In specific implementation, in an embodiment, the processor 401 may include one or more CPUs, for example, a CPU 0 and a CPU 1 in FIG. 4.

In specific implementation, in an embodiment, the communication device 400 may include a plurality of processors, for example, the processor 401 and a processor 408 in FIG. 4. Each of the processors may be a single-CPU processor or a multi-CPU processor. The processor herein may refer to one or more devices, circuits, and/or processing cores configured to process data (for example, computer program instructions).

In specific implementation, in an embodiment, the communication device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive an input of a user in a plurality of manners. For example, the input device 406 may be a mouse, a keyboard, a touchscreen device, or a sensing device.

The communication device 400 may be a general-purpose device or a dedicated device. In specific implementation, the communication device 400 may be a desktop computer, a portable computer, a network server, a personal digital assistance (PDA), a mobile phone, a tablet computer, a wireless terminal device, an embedded device, or a device with a structure similar to the structure in FIG. 4. A type of the communication device 400 is not limited in this embodiment of this application.

The following specifically describes the virtual network communication method provided in the embodiments of this application with reference to FIG. 1 to FIG. 4.

It should be noted that, in the following embodiments of this application, names of messages between network elements, names of parameters in messages, or the like are merely examples, and there may be other names during specific implementation. This is not specifically limited in the embodiments of this application.

The following example is used: The communication system shown in FIG. 1 is used in the 5G network shown in FIG. 2, the session management network element 1 is the SMF1 network element, the session management network element 2 is the SMF2 network element, the user plane network element 1 is the UPF1 network element, and the user plane network element 2 is the UPF2 network element. FIG. 5A and FIG. 5B show a virtual network communication method according to an embodiment of this application. The virtual network communication method includes the following steps.

S501: A terminal device 1 sends a session establishment request 1 to an SMF1 network element. The SMF1 network element receives the session establishment request 1 from the terminal device 1.

The session establishment request 1 includes an identifier of the terminal device 1. Optionally, the session establishment request 1 may further include an identifier of a first 5GVN group to which the terminal device 1 belongs.

It should be noted that although not shown, the session establishment request 1 is sent by the terminal device 1 to the SMF1 network element through an AMF network element. A general description is provided herein, and details are not described below again.

Optionally, in this embodiment of this application, the identifier of the terminal device 1 carried in the session establishment request 1 may be, for example, a permanent identifier, such as a subscription permanent identifier (SUPI), a generic public subscription identifier (GPSI), an international mobile subscriber identification number (IMSI), a mobile station integrated service digital network number (MSISDN), a global unique temporary identifier (GUTI), or a data network-related identifier (for example, a network access identifier (NAI) or a local area network-specific user identifier). Alternatively, the identifier of the terminal device 1 carried in the session establishment request 1 may be address information of the terminal device 1, for example, may be an internet protocol version 4 (IPv4) address, an internet protocol version 6 (IPv6) IPv6 address, a MAC address, or a MAC address+a VID. This is not specifically limited in this embodiment of this application.

Optionally, in this embodiment of this application, the identifier of the first 5GVN group is used to identify the first 5GVN group. One 5GVN may correspond to one 5GVN group. In this case, an identifier of the 5GVN group is an identifier of the 5GVN. Alternatively, one 5GVN may correspond to a plurality of groups. In this case, an identifier of a 5GVN group includes an identifier of the 5GVN and a group identifier. A general description is provided herein, and details are not described below again.

Optionally, in terms of a format, the identifier of the 5GVN group may be a special domain name (for example, a data network name (DNN)), a fully qualified domain name (FQDN), a VID, a character string, an internal group identifier, an external group identifier, a sequence number, or the like. In addition, the identifier of the 5GVN group may alternatively be in some special formats. For example, the identifier of the 5GVN group may alternatively include one or more of information such as provider information, operator information, network information, and domain information. This is not specifically limited in this embodiment of this application.

S502: The SMF1 network element selects a UPF1 network element to serve the terminal device 1, establishes an N3 tunnel between the UPF1 network element and an access device 1, and establishes or configures the following forwarding rule on the UPF1 network element: sending a data packet whose destination address is an address of the terminal device 1 to the access device 1 on the corresponding N3 tunnel. For related descriptions, refer to a conventional technology. Details are not described herein.

It should be noted that, if the identifier of the first 5GVN group to which the terminal device 1 belongs is not carried in step S501, the SMF1 network element may query, based on local configuration or from another network element (for example, a UDM network element), the identifier of the first 5GVN group to which the terminal device 1 belongs.

Optionally, in this embodiment of this application, the SMF1 network element or the UPF1 network element may allocate tunnel information of the UPF1 network element. For related descriptions of the tunnel information of the UPF1 network element, refer to descriptions in the foregoing embodiments. Details are not described herein again.

Optionally, in this embodiment of this application, if the identifier of the terminal device 1 in step S501 is the permanent identifier of the terminal device 1, the SMF1 network element may alternatively allocate address information to the terminal device 1. For related descriptions of the address information of the terminal device 1, refer to step S501. Details are not described herein again.

S503: The SMF1 network element sends a message 1 to a GSMF network element. The GSMF network element receives the message 1 from the SMF1 network element.

The message 1 includes an identifier of the terminal device 1 and an identifier of the SMF1 network element.

For example, the message 1 may be, for example, a notification message. A name of the message 1 is not specifically limited in this embodiment of this application.

Optionally, before the SMF1 network element sends the message 1 to the GSMF network element, the SMF1 network element may send a request message to the GSMF network element. The request message includes the identifier of the terminal device 1, and the request message is used to obtain, based on the identifier of the terminal device 1, the identifier of the 5GVN group to which the terminal device 1 belongs, and/or is used to obtain the address information of the terminal device 1, which is not specifically limited in this embodiment of this application.

The identifier of the terminal device 1 may be the identifier of the terminal device 1 in the session establishment request 1 in step S501. Alternatively, if the identifier of the terminal device 1 in the session establishment request 1 in step S501 is the permanent identifier of the terminal device 1, the identifier of the terminal device 1 in the message 1 may alternatively be address information allocated by the SMF1 network element or the UPF1 network element to the terminal device 1. A general description is provided herein, and details are not described below again.

Optionally, the message 1 may further include the identifier of the first 5GVN group to which the terminal device 1 belongs. Certainly, in an example, if the message 1 does not include the identifier of the first 5GVN group to which the terminal device 1 belongs, the GSMF network element may determine, based on the identifier of the terminal device 1 in the message 1 and a mapping relationship between an identifier of a terminal device and an identifier of a 5GVN group to which the terminal device belongs pre-stored in the GSMF network element, the identifier of the first 5GVN group to which the terminal device 1 belongs. This is not specifically limited in this embodiment of this application.

Optionally, the message 1 may further include an identifier of the UPF1 network element.

Optionally, if the SMF1 network element or the UPF1 network element may allocate the tunnel information of the UPF1 network element in step S502, the message 1 in step S503 may further include the tunnel information of the UPF1 network element.

Optionally, in this embodiment of this application, because the GSMF network element is configured to manage a topology structure of a 5GVN, after receiving the message 1, the GSMF network element may store a mapping relationship between the identifier of the terminal device 1, the identifier of the SMF1 network element, the identifier of the UPF1 network element (optional), the tunnel information of the UPF1 network element (optional), and the identifier of the first 5GVN group to which the terminal device 1 belongs. Certainly, as described above, the mapping relationship between the identifier of the terminal device 1 and the identifier of the first 5GVN group to which the terminal device 1 belongs may be stored in the GSMF network element before the terminal device 1 establishes a session. This is not specifically limited in this embodiment of this application.

For example, assuming that the terminal device 1 is the first terminal device that reports topology information of the first 5GVN group to the GSMF network element, the topology information that is of the first 5GVN group and that is established by the GSMF network element may be that shown in Table 1.

TABLE 1

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of the UPF1 network element | Tunnel information of the UPF1 network element | Identifier of the terminal device 1 |

It should be noted that, in this embodiment of this application, after the GSMF network element receives the message 1, if the GSMF network element may determine the identifier of the SMF1 network element that sends the message 1, the message 1 may alternatively not carry the identifier of the SMF1 network element. A general description is provided herein, and details are not described below again.

Alternatively, for example, assuming that the terminal device 1 is not the first terminal device that reports topology information of the first 5GVN group to the GSMF network element, the topology information that is of the first 5GVN group and that is updated by the GSMF network element may be that shown in Table 2 or Table 3.

TABLE 2

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of the UPF1 network element | Tunnel information of the UPF1 network element | Identifier of a terminal device 3 Identifier of the terminal device 1 |

TABLE 3

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of a UPF3 network element | Tunnel information of the UPF3 network element | Identifier of a terminal device 4 |
| | | Identifier of the UPF1 network element | Tunnel information of the UPF1 network element | Identifier of the terminal device 1 |

It should be noted that, in Table 2, the following example is used for description: The terminal device 3 has established a session before the terminal device 1 establishes the session, and a UPF network element serving the terminal device 1 and a UPF network element serving the terminal device 3 are both the UPF1 network element (that is, different terminal devices are served by a same UPF network element). In Table 3, the following example is used for description: The terminal device 4 has established a session before the terminal device 1 establishes the session; a UPF network element serving the terminal device 1 is the UPF1 network element, a UPF network element serving the terminal device 4 is the UPF3 network element, but both the UPF1 network element and the UPF3 network element are managed by the SMF1 network element (that is, different terminal devices are served by different UPF network elements managed by a same SMF network element). For information about manners of communication between different terminal devices in the 5GVN corresponding to the foregoing two scenarios, refer to a communication manner in an existing scenario including a single SMF network element. Details are not described herein.

It should be noted that Table 1 to Table 3 are merely examples of a table storage form of the topology information of the first 5GVN group. Certainly, the topology information of the first 5GVN group may alternatively be stored on the GSMF network element in another manner. For example, any two columns in Table 1 to Table 3 are combined and correspondingly stored. For example, the identifier of the 5GVN group and the identifier of the SMF network element are combined and correspondingly stored, the identifier of the SMF network element and the identifier of the UPF network element are combined and correspondingly stored, the identifier of the SMF network element and the tunnel information of the UPF network element are combined and correspondingly stored, and the identifier of the UPF network element and the identifier of the terminal device are combined and correspondingly stored. Regardless of a storage manner, the topology information of the first 5GVN group may represent a mapping relationship between the identifier of the terminal device, the identifier of the first 5GVN group to which the terminal device 1 belongs, an identifier of a UPF network element serving the terminal device (optional), tunnel information of the UPF network element serving the terminal device (optional), and an identifier of an SMF network element that manages the UPF network element serving the terminal device. A general description is provided herein. The description is applicable to another table provided in this embodiment of this application. Details are not described below again.

S504: A terminal device 2 sends a session establishment request 2 to an SMF2 network element. The SMF2 network element receives the session establishment request 2 from the terminal device 2.

The session establishment request 2 includes an identifier of the terminal device 2. Optionally, the session establishment request 2 may further include the identifier of the first 5GVN group to which the terminal device 2 belongs.

For related descriptions of step S504, refer to step S501. Details are not described herein again.

S505: The SMF2 network element selects a UPF2 network element to serve the terminal device 2, establishes an N3 tunnel between the UPF2 network element and an access device 2, and establishes or configures the following forwarding rule on the UPF2 network element: sending a data packet whose destination address is an address of the terminal device 2 to the access device 2 on the corresponding N3 tunnel. For related descriptions, refer to the conventional technology. Details are not described herein.

It should be noted that if the identifier of the first 5GVN group to which the terminal device 2 belongs is not carried in step S504, the SMF2 network element may query, based on the local configuration or from the UDM network element, the identifier of the first 5GVN group to which the terminal device 2 belongs.

Optionally, in this embodiment of this application, the SMF2 network element or the UPF2 network element may allocate tunnel information of the UPF2 network element. For related descriptions of the tunnel information of the UPF2 network element, refer to descriptions in the foregoing embodiments. Details are not described herein again.

Optionally, in this embodiment of this application, if the identifier of the terminal device 2 in step S504 is a permanent identifier of the terminal device 2, the SMF2 network element may alternatively allocate address information to the terminal device 2. For related descriptions of the address information of the terminal device 2, refer to step S501. Details are not described herein again.

S506: The SMF2 network element sends a message 2 to the GSMF network element. The GSMF network element receives the message 2 from the SMF2 network element.

The message 2 includes the identifier of the terminal device 2 and an identifier of the SMF2 network element.

For example, the message 2 may be, for example, a notification message. A name of the message 2 is not specifically limited in this embodiment of this application.

The identifier of the terminal device 2 may be the identifier of the terminal device 2 in the session establishment request 2 in step S504. Alternatively, if the identifier of the terminal device 2 in the session establishment request 2 in step S504 is the permanent identifier of the terminal device 2, the identifier of the terminal device 2 in the message 2 may alternatively be address information allocated by the SMF2 network element or the UPF2 network element to the terminal device 2. A general description is provided herein, and details are not described below again.

It should be noted that, in this embodiment of this application, after the GSMF network element receives the message 2, if the GSMF network element may determine the identifier of the SMF2 network element that sends the message 2, the message 2 may alternatively not carry the identifier of the SMF2 network element. A general description is provided herein, and details are not described below again.

Optionally, the message 2 may further include the identifier of the first 5GVN group to which the terminal device 2 belongs. Certainly, if the message 2 does not include the identifier of the first 5GVN group to which the terminal device 2 belongs, the GSMF network element may determine, based on the identifier of the terminal device 2 in the message 2 and a mapping relationship between an identifier of a terminal device and an identifier of a 5GVN group to which the terminal device belongs pre-stored in the GSMF network element, the identifier of the first 5GVN group to which the terminal device 2 belongs. This is not specifically limited in this embodiment of this application.

Optionally, the message 2 may further include an identifier of the UPF2 network element.

Optionally, if the SMF2 network element or the UPF2 network element may allocate the tunnel information of the UPF2 network element in step S505, the message 2 in step S506 may further include the tunnel information of the UPF2 network element.

Optionally, in this embodiment of this application, because the GSMF network element is configured to manage the topology structure of the 5GVN, after receiving the message 2, the GSMF network element may store a mapping relationship between the identifier of the terminal device 2, the identifier of the SMF2 network element, the identifier of the UPF2 network element (optional), the tunnel information of the UPF2 network element (optional), and the identifier of the first 5GVN group to which the terminal device 2 belongs. Certainly, as described above, the mapping relationship between the identifier of the terminal device 2 and the identifier of the first 5GVN group to which the terminal device 2 belongs may be stored in the GSMF network element before the terminal device 2 establishes a session. This is not specifically limited in this embodiment of this application.

For example, it is assumed that before the terminal device 2 establishes the session, the topology information that is of the first 5GVN group and that is managed by the GSMF network element is that shown in Table 1, Table 2, or Table 3. After the terminal device 2 establishes the session, the topology information that is of the first 5GVN group and that is updated by the GSMF network element may be respectively that shown in Table 4, Table 5, or Table 6.

TABLE 4

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of the UPF1 network element | Tunnel information of the UPF1 network element | Identifier of the terminal device 1 |
| | Identifier of the SMF2 network element | Identifier of the UPF2 network element | Tunnel information of the UPF2 network element | Identifier of the terminal device 2 |

TABLE 5

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of the UPF1 network element | Tunnel information of the UPF1 network element | Identifier of the termina ldevice 3 Identifier of the terminal device 1 |
| | Identifier of the SMF2 network element | Identifier of the UPF2 network element | Tunnel information of the UPF2 network element | Identifier of the terminal device 2 |
| Identifier of a 5GVN group | Identifier of an SMF network element element | Identifier of a UPF network element (optional) element | Tunnel information of the UPF network element (optional) element | Identifier of a terminal device device 2 |

TABLE 6

| Identifier of a 5GVN group | Identifier of an SMF network element | Identifier of a UPF network element (optional) | Tunnel information of the UPF network element (optional) | Identifier of a terminal device |
|---|---|---|---|---|
| Identifier of the first 5GVN group | Identifier of the SMF1 network element | Identifier of the UPF3 network element | Tunnel information of the UPF3 network element | Identifier of the terminal device 4 |
| | | Identifier of the UPF1 network element | Tunnel information of the UPF1 network element | Identifier of the terminal device 1 |
| | Identifier of the SMF2 network element | Identifier of the UPF2 network element | Tunnel information of the UPF2 network element | Identifier of the terminal device 2 |

Optionally, in this embodiment of this application, in a process in which the terminal device 2 establishes the session, after the GSMF network element receives the message 2 from the SMF2 network element, if the GSMF network element determines that an SMF network element (for example, the SMF1 network element in this embodiment of this application) different from the SMF2 network element exists in the topology information that is of the first 5GVN group and that is managed by the GSMF network element, a corresponding forwarding rule needs to be established on the UPF2 network element and a UPF network element that is managed by another SMF network element and that serves a terminal device belonging to the first 5GVN group. If the UPF2 network element serves the terminal device belonging to the first 5GVN group for the first time, a tunnel between the UPF2 network element and the UPF network element that is managed by the another SMF network element and that serves the terminal device belonging to the first 5GVN group may be established.

The following uses an example in which the corresponding forwarding rule is established on the UPF2 network element and the UPF network element that is managed by the another SMF network element and that serves the terminal device belonging to the first 5GVN group for description.

In a possible implementation (manner 1), if the topology information that is of the first 5GVN group and that is managed by the GSMF network element includes the tunnel information of the UPF network element, the virtual network communication method provided in this embodiment of this application may further include the following steps S507 to S510.

S507: The GSMF network element sends a message 3 to another SMF network element (for example, the SMF1 network element in this embodiment of this application) different from the SMF2 network element corresponding to the terminal device 2. The SMF1 network element receives the message 3 from the GSMF network element.

The message 3 includes the identifier of the terminal device 2, the identifier of the first 5GVN group to which the terminal device 2 belongs, and the tunnel information of the UPF2 network element serving the terminal device 2.

For example, the message 3 may be a request message or a notification message. A name of the message 3 is not specifically limited in this embodiment of this application.

S508: The SMF1 network element configures, based on the identifier of the terminal device 2, the identifier of the first 5GVN group to which the terminal device 2 belongs, and the tunnel information of the UPF2 network element serving the terminal device 2, a forwarding rule 1 on a UPF network element (for example, the UPF1 network element in this embodiment of this application) that is managed by the SMF1 network element and that serves the terminal device in the first 5GVN group. The forwarding rule 1 is used by the UPF1 network element to send a data packet to the UPF2 network element (based on the tunnel information of the UPF2 network element) when a terminal device (for example, the foregoing terminal device 1) that belongs to the first 5GVN group and that is served by the UPF1 network element sends the data packet to the terminal device 2 belonging to the first 5GVN group.

It should be noted that in the foregoing steps S507 and S508, an example in which the SMF network element different from the SMF2 network element is the SMF1 network element, and the UPF network element that is managed by the SMF1 network element and that serves the terminal device belonging to the first 5GVN group is the UPF1 network element is used for description. Certainly, if another SMF network element, other than the SMF1 network element, different from the SMF2 network element exists in the topology information that is of the first 5GVN group and that is managed by the GSMF network element, a forwarding rule similar to the forwarding rule 1 may be configured on a corresponding UPF network element with reference to steps S507 and S508, so that a data packet may be routed from the corresponding UPF network element to the UPF2 network element when the data packet is sent to the terminal device 2 belonging to the first 5GVN group. Alternatively, if UPF network elements that are managed by the SMF1 network element and that serve the terminal device in the first 5GVN group include another UPF network element in addition to the UPF1 network element, a forwarding rule similar to the forwarding rule 1 may be configured on the another UPF network element with reference to step S508, so that a data packet may be routed from the another UPF network element to the UPF2 network element when the data packet is sent to the terminal device 2 belonging to the first 5GVN group. Details are not described herein again.

S509: The GSMF network element sends a message 4 to the SMF2 network element. The SMF2 network element receives the message 4 from the GSMF network element.

The message 4 includes the identifier of the terminal device 1, the identifier of the first 5GVN group to which the terminal device 1 belongs, and the tunnel information of the UPF1 network element serving the terminal device 1.

For example, the message 4 may be a request message or a notification message. A name of the message 3 is not specifically limited in this embodiment of this application.

S510: The SMF2 network element configures a forwarding rule 2 on the UPF2 network element based on the identifier of the terminal device 1, the identifier of the first 5GVN group to which the terminal device 1 belongs, and the tunnel information of the UPF1 network element serving the terminal device 1. The forwarding rule 2 is used by the UPF2 network element to send a data packet to the UPF1 network element (based on the tunnel information of the UPF1 network element) when a terminal device (for example, the foregoing terminal device 2) that belongs to the first 5GVN group and that is served by the UPF2 network element sends the data packet to the terminal device 1 belonging to the first 5GVN group.

It should be noted that, in the foregoing steps S509 and S510, an example in which only topology information related to the terminal device 1 and topology information related to the terminal device 2 exist in the topology information that is of the first 5GVN group and that is managed by the GSMF network element is used for description. Certainly, if the topology information that is of the first 5GVN group and that is managed by the GSMF network element further includes topology information related to another terminal device, the message 4 further includes the topology information related to the another terminal device, so that the SMF network element 2 may configure a forwarding rule similar to the forwarding rule 2 on the UPF network element based on the topology information related to the another terminal device, so that a data packet may be routed from the UPF2 network element to another UPF network element when the data packet is sent to the another terminal device belonging to the first 5GVN group. For example, it is assumed that the topology information that is of the first 5GVN group and that is managed by the GSMF network element is that shown in Table 6. The message 4 may further include the identifier of the terminal device 4, the identifier of the first 5GVN group to which the terminal device 4 belongs, and the tunnel information of the UPF3 network element serving the terminal device 4. Further, the SMF2 network element may configure a forwarding rule 3 on the UPF2 network element based on the identifier of the terminal device 4, the identifier of the first 5GVN group to which the terminal device 4 belongs, and the tunnel information of the UPF3 network element serving the terminal device 4. The forwarding rule 3 is used by the UPF2 network element to send a data packet to the UPF3 network element when a terminal device (for example, the terminal device 2) that is served by the UPF2 network element and that belongs to the first 5GVN group sends the data packet to the terminal device 4 belonging to the first 5GVN group.

It should be noted that in this embodiment of this application, there is no necessary execution sequence between steps S507 and S508 and steps S509 and S510. Steps S507 and S508 may be performed first, and then steps S509 and S510 are performed. Alternatively, steps S509 and S510 may be performed first, and then steps S507 and S508 are performed. Alternatively, steps S507 and S508 and steps S509 and S510 may be performed simultaneously. This is not specifically limited in this embodiment of this application.

Alternatively, in another possible implementation (manner 2), if the topology information that is of the first 5GVN group and that is managed by the GSMF network element does not include the tunnel information of the UPF network element, the virtual network communication method provided in this embodiment of this application may further include the following steps S511 to S518.

S511: The GSMF network element sends a message 5 to the SMF2 network element. The SMF2 network element receives the message 5 from the GSMF network element.

The message 5 may include the identifier of the first 5GVN group and the identifier of the terminal device 2, and is used to request to establish a tunnel for the terminal device 2 belonging to the first 5GVN group.

For example, the message 5 may be a request message. A name of the message 5 is not specifically limited in this embodiment of this application.

S512: The SMF2 network element obtains the tunnel information of the UPF2 network element.

In this embodiment of this application, the tunnel information of the UPF2 network element may be allocated by the SMF2 network element, or may be allocated by the UPF2 network element upon request of the SMF2 network element. This is not specifically limited in this embodiment of this application.

S513: The SMF2 network element sends a message 6 to the GSMF network element. The GSMF network element receives the message 6 from the SMF2 network element.

The message 6 includes the tunnel information of the UPF2 network element. Optionally, the message 6 includes the identifier of the terminal device 2 and the identifier of the first 5GVN group to which the terminal device 2 belongs.

For example, the message 6 may be a response message. A name of the message 6 is not specifically limited in this embodiment of this application.

Optionally, in this embodiment of this application, after receiving the message 6 from the SMF2 network element, the GSMF network element may update the topology information of the first 5GVN group. For example, the GSMF network element establishes a mapping relationship between the identifier of the terminal device 2, the identifier of the SMF2 network element, the identifier of the UPF2 network element (optional), the identifier of the first 5GVN group to which the terminal device 2 belongs, and the tunnel information of the UPF2 network element. A general description is provided herein, and details are not described below again.

S514: The GSMF network element sends a message 7 to the another SMF network element (for example, the SMF1 network element in this embodiment of this application) different from the SMF2 network element corresponding to the terminal device 2. The SMF1 network element receives the message 7 from the GSMF network element.

The message 7 includes the identifier of the terminal device 2, the identifier of the first 5GVN group to which the terminal device 2 belongs, and the tunnel information of the UPF2 network element serving the terminal device 2.

For example, the message 7 may be a request message or a notification message. A name of the message 7 is not specifically limited in this embodiment of this application.

S515: The SMF1 network element configures, based on the identifier of the terminal device 2, the identifier of the first 5GVN group to which the terminal device 2 belongs, and the tunnel information of the UPF2 network element serving the terminal device 2, the forwarding rule 1 on a UPF network element (for example, the UPF1 network element in this embodiment of this application) that is managed by the SMF1 network element and that serves the terminal device in the first 5GVN group. The forwarding rule 1 is used by the UPF1 network element to send a data packet to the UPF2 network element when the terminal device (for example, the foregoing terminal device 1) that belongs to the first 5GVN group and that is served by the UPF1 network element sends the data packet to the terminal device 2 belonging to the first 5GVN group.

In addition, the SMF1 network element may further obtain tunnel information of the UPF network element (for example, the UPF1 network element in this embodiment of this application) that is managed by the SMF1 network element and that serves the terminal device in the first 5GVN group. The tunnel information of the UPF network element may be allocated by the SMF1 network element, or may be allocated by the UPF network element. This is not specifically limited in this embodiment of this application.

S516: The SMF1 network element sends a message 8 to the GSMF network element. The GSMF network element receives the message 8 from the SMF1 network element.

The message 8 includes the tunnel information of the UPF1 network element. Optionally, the message 8 includes the identifier of the first 5GVN group, and an identifier of the terminal device (for example, the terminal device 1 in this embodiment of this application) that belongs to the first 5GVN group and that is served by the UPF1 network element.

For example, the message 8 may be a response message. A name of the message 8 is not specifically limited in this embodiment of this application.

Optionally, after receiving the message 8 from the SMF1 network element, the GSMF network element may update the topology information of the first 5GVN group. For example, the GSMF network element establishes a mapping relationship between the identifier of the terminal device 1, the identifier of the SMF1 network element, the identifier of the UPF1 network element (optional), the identifier of the first 5GVN group to which the terminal device 1 belongs, and the tunnel information of the UPF1 network element. A general description is provided herein, and details are not described below again.

S517: The GSMF network element sends a message 9 to the SMF2 network element. The SMF2 network element receives the message 9 from the GSMF network element.

The message 9 includes the identifier of the terminal device 1, the identifier of the first 5GVN group to which the terminal device 1 belongs, and the tunnel information of the UPF1 network element serving the terminal device 1.

For example, the message 9 may be a request message or a notification message. A name of the message 9 is not specifically limited in this embodiment of this application.

Optionally, in this embodiment of this application, if the message 8 does not include the identifier of the terminal device (for example, the terminal device 1 in this embodiment of this application) that belongs to the first 5GVN group and that is served by the UPF1 network element, after receiving the message 8, the GSMF network element may determine the identifier of the terminal device (for example, the terminal device 1 in this embodiment of this application) that belongs to the first 5GVN group and that is served by the UPF1 network element. For example, the GSMF network element may determine the identifier of the corresponding UPF1 network element based on the tunnel information of the UPF1 network element, and further determine, based on a mapping relationship between an identifier of a UPF network element, an identifier of a 5GVN group, and an identifier of a terminal device, the identifier of the terminal device (for example, the terminal device 1 in this embodiment of this application) that belongs to the first 5GVN group and that is served by the UPF1 network element. This is not specifically limited in this embodiment of this application.

S518: The SMF2 network element configures the forwarding rule 2 on the UPF2 network element based on the identifier of the terminal device 1, the identifier of the first 5GVN group to which the terminal device 1 belongs, and the tunnel information of the UPF1 network element serving the terminal device 1. The forwarding rule 2 is used by the UPF2 network element to send a data packet to the UPF1 network element when the terminal device (for example, the foregoing terminal device 2) that belongs to the first 5GVN group and that is served by the UPF2 network element sends the data packet to the terminal device 1 belonging to the first 5GVN group.

It should be noted that in the foregoing steps S514 to S518, an example in which the SMF network element different from the SMF2 network element is the SMF1 network element, and the UPF network element that is managed by the SMF1 network element and that serves the terminal device belonging to the first 5GVN group is the UPF1 network element is used for description. Certainly, if another SMF network element, other than the SMF1 network element, different from the SMF2 network element exists in the topology information that is of the first 5GVN group and that is managed by the GSMF network element, a forwarding rule similar to the forwarding rule 1 may be configured on a corresponding UPF network element, and a forwarding rule similar to the forwarding rule 2 may be configured on the UPF2 network element with reference to the foregoing steps S514 to S518, so that a data packet may be routed from the corresponding UPF network element to the UPF2 network element when the data packet is sent to the terminal device 2 belonging to the first 5GVN group, and a data packet may be routed from the UPF2 network element to another UPF network element when the data packet is sent to another terminal device belonging to the first 5GVN group. For example, assuming that the topology information that is of the first 5GVN group and that is managed by the GSMF network element is that shown in Table 6, the message 8 may include the tunnel information of the UPF 3 network element and the identifier of the terminal device 4 (optional). Further, the message 5 may further include the identifier of the terminal device 4, the identifier of the first 5GVN group to which the terminal device 4 belongs, and the tunnel information of the UPF3 network element serving the terminal device 4. Further, the SMF2 network element may configure a forwarding rule 3 on the UPF2 network element based on the identifier of the terminal device 4, the identifier of the first 5GVN group to which the terminal device 4 belongs, and the tunnel information of the UPF3 network element serving the terminal device 4. The forwarding rule 3 is used by the UPF2 network element to send a data packet to the UPF3 network element when the terminal device (for example, the terminal device 2) that is served by the UPF2 network element and that belongs to the first 5GVN group sends the data packet to the terminal device 4 belonging to the first 5GVN group.

Optionally, manner 2 is described by using an example in which the tunnel information of the UPF2 network element is first obtained and then the tunnel information of the UPF1 network element is obtained. Certainly, the tunnel information of the UPF1 network element may be first obtained, and then the tunnel information of the UPF2 network element is obtained. This is not specifically limited in this embodiment of this application.

It should be noted that in both manner 1 and manner 2, an example in which the corresponding forwarding rule is established on the UPF2 network element and the UPF network element that is managed by the another SMF network element and that serves the terminal device belonging to the first 5GVN group is used for description. Certainly, if the UPF2 network element serves the terminal device belonging to the first 5GVN group for the first time, only the tunnel between the UPF2 network element and the UPF network element that is managed by the another SMF network element and that serves the terminal device belonging to the first 5GVN group may be established. In this case, the GSMF network element may send only tunnel information of the UPF network element and the identifier of the first 5GVN group to the corresponding SMF, and does not need to send an identifier of the terminal device that belongs to the first 5GVN group and that is served by the UPF network element. A general description is provided herein, and details are not described below again.

Optionally, in manner 2, it is assumed that there is an interface (assuming that the interface is an Ny interface) between the SMF1 network element and the SMF2 network element. When a tunnel between the UPF1 network element and the UPF2 network element is established, the SMF1 network element and the SMF2 network element may directly exchange the tunnel information of the UPF1 network element and the tunnel information of the UPF2 network element. For example, after step S512, the SMF2 network element directly sends the tunnel information of the UPF2 network element and the identifier of the corresponding first 5GVN group to the SMF1 network element, and steps S513 and S514 do not need to be performed. Similarly, the SMF1 network element directly sends the tunnel information of the UPF1 network element and the identifier of the corresponding first 5GVN group to the SMF2 network element, and the foregoing steps S516 and S517 do not need to be performed. A general description is provided herein, and details are not described below again. Certainly, if forwarding rules need to be established on the UPF1 network element and the UPF2 network element, in addition to exchanging the foregoing information, an identifier of a terminal device corresponding to the tunnel information of the UPF1 network element further needs to be exchanged. For example, the SMF2 network element directly sends, to the SMF1 network element, the tunnel information of the UPF2 network element, the identifier of the terminal device 2, and the identifier of the first 5GVN group to which the terminal device 2 belongs. The SMF1 network element directly sends, to the SMF2 network element, the tunnel information of the UPF1 network element, the identifier of the terminal device 1, and the identifier of the first 5GVN group to which the terminal device 1 belongs. A general description is provided herein, and details are not described below again.

The virtual network communication method provided in this embodiment of this application can implement private communication between the terminal device 1 that belongs to the first 5GVN group and that is served by the UPF1 network element managed by the SMF1 network element and the terminal device 2 that belongs to the first 5GVN group and that is served by the UPF2 network element managed by the SMF2 network element. That is, private communication of a 5GVN service across SMF network elements can be implemented.

Actions of the GSMF network element, the SMF1 network element, or the SMF2 network element in steps S501 to S518 may be performed by the processor 401 in the communication device 400 shown in FIG. 4 by invoking application program code stored in the memory 403. This is not limited in this embodiment.

Figure 6:
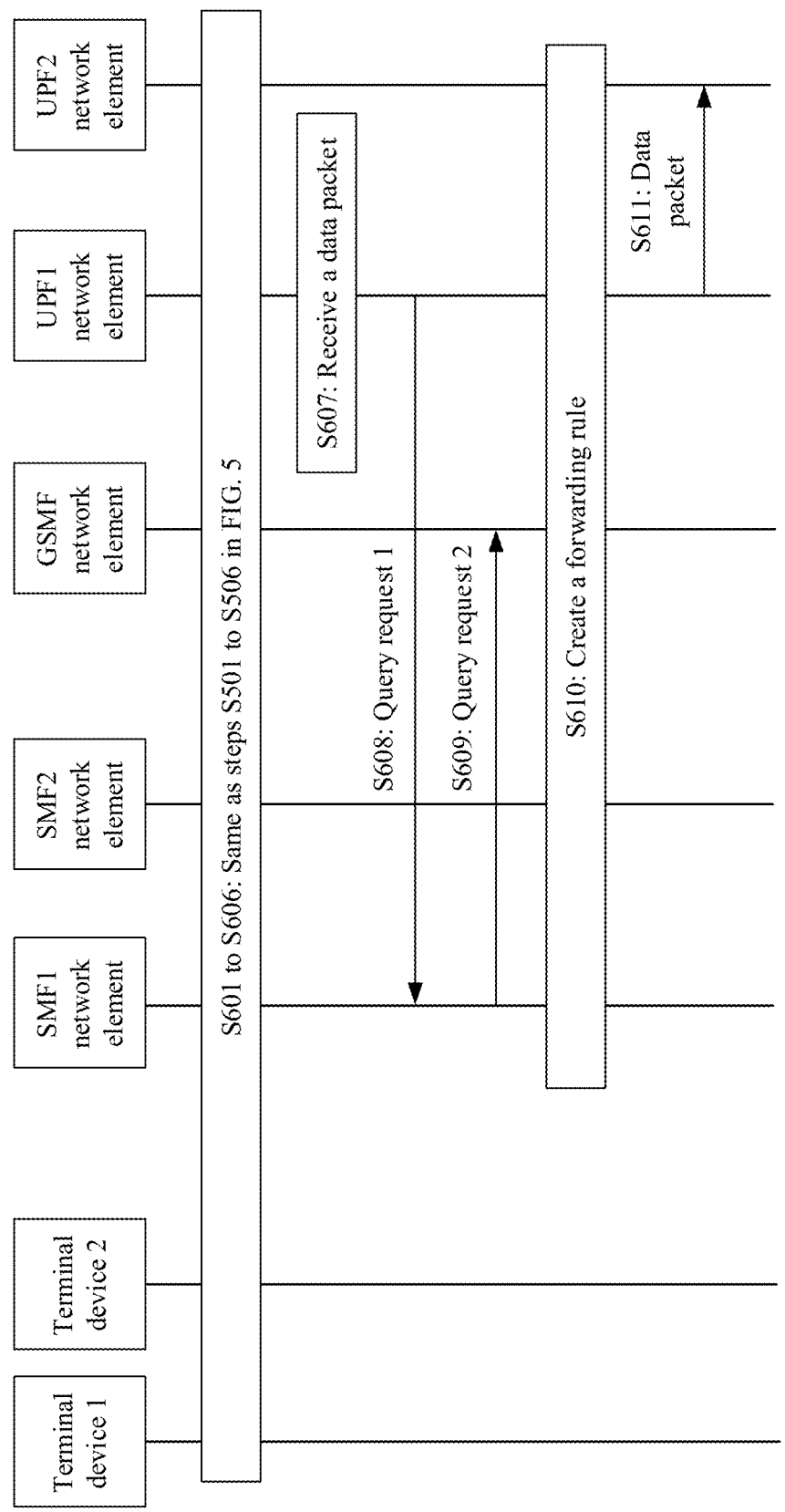
FIG. 6 is a schematic diagram of a flowchart of a virtual network communication method according to an embodiment of this application.

Optionally, the following example is used: The communication system shown in FIG. 1 is used in the 5G network shown in FIG. 2, the session management network element 1 is the SMF1 network element, the session management network element 2 is the SMF2 network element, the user plane network element 1 is the UPF1 network element, and the user plane network element 2 is the UPF2 network element. FIG. 6 shows another virtual network communication method according to an embodiment of this application. The virtual network communication method includes the following steps.

S601 to S606 are the same as steps S501 to S506 in the embodiment shown in FIG. 5A and FIG. 5B. For related descriptions, refer to the embodiment shown in FIG. 5A and FIG. 5B. Details are not described herein again.

S607: A UPF1 network element receives a data packet, where the data packet carries an identifier of a terminal device 2.

For example, the identifier of the terminal device 2 carried in the data packet may be an IP address of the terminal device 2 or a MAC address of the terminal device that is a destination address of the data packet.

Optionally, in this embodiment of this application, the UPF1 network element may determine an identifier of a 5GVN group (assuming that the 5GVN group is a first 5GVN group) to which the terminal device 2 belongs. For example, the data packet is received on an N3 uplink tunnel of a PDU session of a terminal device 1. Because the PDU session serves the first 5GVN group, the UPF1 network element may determine that the 5GVN group to which the terminal device 2 belongs is the first 5GVN group. For details, refer to steps S501 to S503. Alternatively, for example, the data packet carries the identifier of the 5GVN group to which the terminal device 2 belongs.

S608: When the UPF1 network element determines that the UPF1 network element does not store a forwarding rule corresponding to the terminal device 2, the UPF1 network element sends a query request 1 to an SMF1 network element. The SMF1 network element receives the query request 1 from the UPF1 network element.

The query request 1 carries the identifier of the first 5GVN group to which the terminal device 2 belongs and the identifier of the terminal device 2, and is used to request the forwarding rule corresponding to the terminal device 2 belonging to the first 5GVN group.

S609: When the SMF1 network element determines that the SMF1 network element does not store the forwarding rule corresponding to the terminal device 2 belonging to the first 5GVN group, the SMF1 network element sends a query request 2 to a GSMF network element. The GSMF network element receives the query request 2 from the SMF1 network element.

The query request 2 carries the identifier of the first 5GVN group to which the terminal device 2 belongs and the identifier of the terminal device 2, and is used to request the forwarding rule corresponding to the terminal device 2 belonging to the first 5GVN group.

S610: The GSMF network element may determine, based on information that is related to the terminal device 2 and that is reported by an SMF2 network element in step S606, that the terminal device 2 corresponds to the SMF2 network element. Further, a forwarding rule may be created on a corresponding UPF network element in a manner of establishing the corresponding forwarding rule on the UPF network element in the embodiment shown in FIG. 5A and FIG. 5B. For related descriptions, refer to the embodiment shown in FIG. 5A and FIG. 5B. Details are not described herein again.

It should be noted that in this embodiment of this application, when a tunnel between UPF network elements exists, only a unidirectional forwarding rule may be created. For example, in this embodiment of this application, the forwarding rule corresponding to the terminal device 2 that belongs to the first 5GVN group may be created only on the UPF1 network element, and a forwarding rule does not need to be created on a UPF2 network element. Certainly, if the identifier of the terminal device that sends the data packet can be obtained, a corresponding forwarding rule may be created on the UPF2 network element in a manner of establishing the corresponding forwarding rule on the UPF network element in the embodiment shown in FIG. 5A and FIG. 5B. A general description is provided herein, and details are not described below again.

S611: The UPF1 network element sends the received data packet to the UPF2 network element according to the forwarding rule on the UPF1 network element.

The virtual network communication method provided in this embodiment of this application can implement private communication between the terminal device 1 that belongs to the first 5GVN group and that is served by the UPF1 network element managed by the SMF1 network element and the terminal device 2 that belongs to the first 5GVN group and that is served by the UPF2 network element managed by the SMF2 network element. That is, private communication of a 5GVN service across SMF network elements can be implemented.

Actions of the GSMF network element, the SMF1 network element, or the SMF2 network element in steps S601 to S611 may be performed by the processor 401 in the communication device 400 shown in FIG. 4 by invoking application program code stored in the memory 403. This is not limited in this embodiment.

It may be understood that, in the foregoing embodiments, the methods and/or steps implemented by the group session management network element may also be implemented by a chip system that implements the foregoing group session management network element, and the methods and/or steps implemented by the session management network element may also be implemented by a chip system that implements the session management network element.

The foregoing mainly describes the solutions provided in the embodiments of this application from a perspective of interaction between network elements. Correspondingly, an embodiment of this application further provides a communication apparatus. The communication apparatus is configured to implement the foregoing methods. The communication apparatus may be the group session management network element in the foregoing method embodiments or a chip system that implements functions of the group session management network element. Alternatively, the communication apparatus may be the session management network element in the foregoing method embodiments or a chip system that implements functions of the session management network element. It can be understood that, to implement the foregoing functions, the communication apparatus includes a corresponding hardware structure and/or software module for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 7:
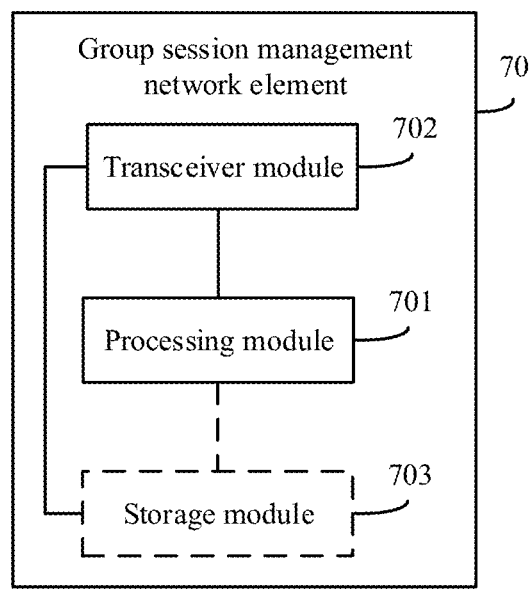
FIG. 7 is a schematic diagram of a structure of a group session management network element according to an embodiment of this application.

For example, the communication apparatus is the group session management network element in the foregoing method embodiments. FIG. 7 is a schematic diagram of a structure of a group session management network element 70. The group session management network element 70 includes a processing module 701 and a transceiver module 702. The transceiver module 702 may also be referred to as a transceiver unit, and is configured to implement a sending and/or receiving function, for example, may be a transceiver circuit, a transceiver machine, a transceiver, or a communication interface.

The processing module 701 is configured to obtain tunnel information of a first user plane network element serving a first terminal device belonging to a first virtual network group, where the first user plane network element is managed by a first session management network element. The transceiver module 702 is configured to send a first message to a second session management network element, where the first message includes an identifier of the first terminal device, an identifier of the first virtual network group, and the tunnel information of the first user plane network element; and the identifier of the first terminal device, the identifier of the first virtual network group, and the tunnel information of the first user plane network element are used to configure a first forwarding rule on a second user plane network element managed by the second session management network element, and the first forwarding rule is used by the second user plane network element to send a first data packet to the first user plane network element when a terminal device that belongs to the first virtual network group and that is served by the second user plane network element sends the first data packet to the first terminal device belonging to the first virtual network group.

Optionally, as shown in FIG. 7, the group session management network element 70 may further include a storage module 703. The transceiver module 702 is further configured to: in a process in which the first terminal device belonging to the first virtual network group establishes a session, receive a second message from the first session management network element, where the second message includes the identifier of the first terminal device and an identifier of the first session management network element. The storage module 703 is configured to store a mapping relationship between the identifier of the first terminal device and the identifier of the first session management network element.

Optionally, the second message further includes at least one of the identifier of the first virtual network group to which the first terminal device belongs and the tunnel information of the first user plane network element serving the first terminal device belonging to the first virtual network group. The storage module 703 is specifically configured to: store a mapping relationship between the identifier of the first terminal device, the identifier of the first session management network element, and at least one of the identifier of the first virtual network group and the tunnel information of the first user plane network element.

Optionally, that the processing module 701 is configured to obtain tunnel information of a first user plane network element serving a first terminal device belonging to a first virtual network group includes: The processing module 701 is configured to: when the mapping relationship includes the tunnel information of the first user plane network element, obtain the stored tunnel information of the first user plane network element serving the first terminal device belonging to the first virtual network group.

Optionally, that the processing module 701 is configured to obtain tunnel information of a first user plane network element serving a first terminal device belonging to a first virtual network group includes: The processing module 701 is configured to: when the mapping relationship does not include the tunnel information of the first user plane network element, send, through the transceiver module 702, a third message to the first session management network element, where the third message is used to request to establish a tunnel for the first terminal device belonging to the first virtual network group; and receive, through the transceiver module 702, the tunnel information that is of the first user plane network element serving the first terminal device belonging to the first virtual network group and that is from the first session management network element.

Optionally, the transceiver module 702 is further configured to receive tunnel information that is of the second user plane network element serving a second terminal device belonging to the first virtual network group and that is from the second session management network element. The transceiver module 702 is further configured to send a fourth message to the first session management network element, where the fourth message includes an identifier of the second terminal device, the identifier of the first virtual network group, and the tunnel information of the second user plane network element; and the identifier of the second terminal device, the identifier of the first virtual network group, and the tunnel information of the second user plane network element are used to configure a second forwarding rule on the first user plane network element, and the second forwarding rule is used by the first user plane network element to send a second data packet to the second user plane network element when a terminal device that belongs to the first virtual network group and that is served by the first user plane network element sends the second data packet to the second terminal device belonging to the first virtual network group.

Optionally, the transceiver module 702 is further configured to receive a fifth message from the second session management network element, where the fifth message is used to request the first forwarding rule.

All related content of the steps in the foregoing method embodiments may be cited in function descriptions of corresponding function modules. Details are not described herein again.

In this embodiment, the group session management network element 70 is presented in a form of function modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the group session management network element 70 may be in a form of the communication device 400 shown in FIG. 4.

For example, the processor 401 in FIG. 4 may invoke the computer-executable instructions stored in the memory 403, to enable the group session management network element 70 to perform the virtual network communication method in the foregoing method embodiments.

Specifically, the processor 401 in FIG. 4 may invoke the computer-executable instructions stored in the memory 403, to implement functions/implementation processes of the processing module 701 and the transceiver module 702 in FIG. 7. Alternatively, functions/implementation processes of the processing module 701 in FIG. 7 may be implemented by the processor 401 in FIG. 4 by invoking the computer-executable instructions stored in the memory 403, and functions/implementation processes of the transceiver module 702 in FIG. 7 may be implemented by using the communication interface 404 in FIG. 4. In addition, functions/implementation processes of the storage module 703 in FIG. 7 may be implemented by using the memory 403 in FIG. 4.

The group session management network element 70 provided in this embodiment can perform the foregoing virtual network communication method. Therefore, for a technical effect that can be achieved by the group session management network element 70, refer to the foregoing method embodiments. Details are not described herein again.

Figure 8:
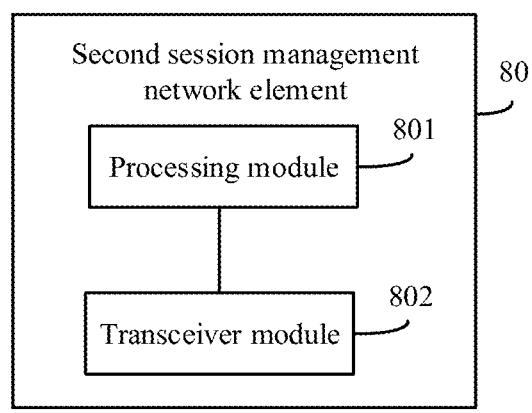
FIG. 8 is a schematic diagram of a structure of a second session management network element according to an embodiment of this application.

For example, the communication apparatus is the second session management network element in the foregoing method embodiments. FIG. 8 is a schematic diagram of a structure of a second session management network element 80. The second session management network element 80 includes a processing module 801 and a transceiver module 802. The transceiver module 802 may also be referred to as a transceiver unit, and is configured to implement a sending and/or receiving function, for example, may be a transceiver circuit, a transceiver machine, a transceiver, or a communication interface.

The transceiver module 802 is configured to: in a process in which a second terminal device belonging to a first virtual network group establishes a session, send a first message to a group session management network element, where the first message includes an identifier of the second terminal device and an identifier of the second session management network element. The transceiver module 802 is further configured to receive a second message from the group session management network element, where the second message includes an identifier of a first terminal device belonging to the first virtual network group, an identifier of the first virtual network group, and tunnel information of a first user plane network element serving the first terminal device belonging to the first virtual network group, where the first user plane network element is managed by a first session management network element. The processing module 801 is configured to configure, based on the identifier of the first terminal device, the identifier of the first virtual network group, and the tunnel information of the first user plane network element, a first forwarding rule on a second user plane network element managed by the second session management network element, where the first forwarding rule is used by the second user plane network element to send a first data packet to the first user plane network element when a terminal device that belongs to the first virtual network group and that is served by the second user plane network element sends the first data packet to the first terminal device belonging to the first virtual network group.

Optionally, the transceiver module 802 is further configured to receive a third message from the second user plane network element, where the third message is used to request the first forwarding rule. The processing module 801 is further configured to determine that the first forwarding rule does not exist on the second session management network element. The transceiver module 802 is further configured to send a fourth message to the group session management network element, where the fourth message is used to request the first forwarding rule.

Optionally, the first message further includes the identifier of the first virtual network group to which the second terminal device belongs.

Optionally, the first message further includes tunnel information of the second user plane network element serving the second terminal device belonging to the first virtual network group.

Optionally, the transceiver module 802 is further configured to receive a fifth message from the group session management network element, where the fifth message is used to request to establish a tunnel for the second terminal device belonging to the first virtual network group. The transceiver module 802 is further configured to send, to the group session management network element, the tunnel information of the second user plane network element serving the second terminal device belonging to the first virtual network group.

All related content of the steps in the foregoing method embodiments may be cited in function descriptions of corresponding function modules. Details are not described herein again.

In this embodiment, the second session management network element 80 is presented in a form of function modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the second session management network element 80 may be in a form of the communication device 400 shown in FIG. 4.

For example, the processor 401 in FIG. 4 may invoke the computer-executable instructions stored in the memory 403, to enable the second session management network element 80 to perform the virtual network communication method in the foregoing method embodiments.

Specifically, the processor 401 in FIG. 4 may invoke the computer-executable instructions stored in the memory 403, to implement functions/implementation processes of the processing module 801 and the transceiver module 802 in FIG. 8. Alternatively, functions/implementation processes of the processing module 801 in FIG. 8 may be implemented by the processor 401 in FIG. 4 by invoking the computer-executable instructions stored in the memory 403, and functions/implementation processes of the transceiver module 802 in FIG. 8 may be implemented by using the communication interface 404 in FIG. 4.

The second session management network element 80 provided in this embodiment can perform the foregoing virtual network communication method. Therefore, for a technical effect that can be achieved by the second session management network element 80, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be in the communication apparatus. When the communication apparatus is the chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer program instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in the computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In this embodiment of this application, the computer may include the foregoing apparatus.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another step, and "a" or "one" does not exclude a case of "a plurality". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the following claims of this application and their equivalent technologies.

What is claimed is:

1. A group session management network element, comprising:
   at least one processor; and
   a memory coupled to the at least one processor and having program instructions stored thereon which, when executed by the at least one processor, cause the group session management network element to:
   obtain tunnel information of a first user plane network element serving a first terminal device belonging to a first virtual network group, wherein the first user plane network element is managed by a first session management network element; and
   send a first message to a second session management network element, wherein the first message comprises an identifier of the first terminal device, an identifier of the first virtual network group, and the tunnel information of the first user plane network element; and the identifier of the first terminal device, the identifier of the first virtual network group, and the tunnel information of the first user plane network element are adapted to configure a first forwarding rule on a second user plane network element managed by the second session management network element, and the first forwarding rule is configured to indicate to the second user plane network element to send a first data packet to the first user plane network element when one terminal device that belongs to the first virtual network group and that is served by the second user plane network element sends the first data packet to the first terminal device.

2. The group session management network element according to claim 1, wherein the program instructions further cause the group session management network element to:
   receive, in a process in which the first terminal device establishes a session, a second message from the first session management network element, wherein the second message comprises the identifier of the first terminal device and an identifier of the first session management network element; and
   store a mapping relationship between the identifier of the first terminal device and the identifier of the first session management network element.

3. The group session management network element according to claim 2, wherein the second message further comprises at least one of an identifier of the first virtual network group or the tunnel information of the first user plane network element serving the first terminal device; and wherein the program instructions further cause the group session management network element to:
   store a mapping relationship between the identifier of the first terminal device, the identifier of the first session management network element, and at least one of the identifier of the first virtual network group and the tunnel information of the first user plane network element.

4. The group session management network element according to claim 3, wherein the program instructions further cause the group session management network element to:
   obtain, when the mapping relationship comprises the tunnel information of the first user plane network element, the tunnel information of the first user plane network element serving the first terminal device.

5. The group session management network element according to claim 3, wherein the program instructions further cause the group session management network element to:
   send, when the mapping relationship does not comprise the tunnel information of the first user plane network element, a third message to the first session management network element, wherein the third message requests to establish a tunnel for the first terminal device; and
   receive, from the first session management network element, the tunnel information of the first user plane network element serving the first terminal device.

6. The group session management network element according to claim 5, wherein the program instructions further cause the group session management network element to:
   receive, from the second session management network element, tunnel information of the second user plane network element serving a second terminal device belonging to the first virtual network group; and
   send a fourth message to the first session management network element, wherein the fourth message comprises an identifier of the second terminal device, the identifier of the first virtual network group, and the tunnel information of the second user plane network element; and the identifier of the second terminal device, the identifier of the first virtual network group, and the tunnel information of the second user plane network element are adapted to configure a second forwarding rule on the first user plane network element, and the second forwarding rule is configured to indicate to the first user plane network element to send a second data packet to the second user plane network element when one terminal device that belongs to the first virtual network group and that is served by the first user plane network element sends the second data packet to the second terminal device.

7. The group session management network element according to claim 1, wherein the program instructions further cause the group session management network element to:
   receive, before obtaining tunnel information of a first user plane network element, a fifth message for requesting the first forwarding rule from the second session management network element.

8. A second session management network element, comprising:
   at least one processor; and
   a memory coupled to the at least one processor and having program instructions stored thereon which, when executed by the at least one processor, cause the second session management network element to:
   send, in a process in which a second terminal device belonging to a first virtual network group establishes a session, a first message to a group session management network element, wherein the first message comprises an identifier of the second terminal device and an identifier of the second session management network element;

receive a second message from the group session management network element, wherein the second message comprises an identifier of a first terminal device belonging to the first virtual network group, an identifier of the first virtual network group, and tunnel information of a first user plane network element serving the first terminal device, wherein the first user plane network element is managed by a first session management network element; and configure, based on the identifier of the first terminal device, the identifier of the first virtual network group, and the tunnel information of the first user plane network element, a first forwarding rule on a second user plane network element managed by the second session management network element, wherein the first forwarding rule indicates the second user plane network element to send a first data packet to the first user plane network element when one terminal device that belongs to the first virtual network group and that is served by the second user plane network element sends the first data packet to the first terminal device.

9. The second session management network element according to claim 8, wherein the program instructions further cause the second session management network element to:
receive a third message for requesting the first forwarding rule from the second user plane network element;
determine that the first forwarding rule does not exist on the second session management network element; and
send a fourth message for requesting the first forwarding rule to the group session management network element.

10. The second session management network element according to claim 8, wherein the first message further comprises the identifier of the first virtual network group.

11. The second session management network element according to claim 8, wherein the first message further comprises tunnel information of the second user plane network element serving the second terminal device.

12. The second session management network element according to claim 8, wherein the program instructions further cause the second session management network element to:
receive, from the group session management network element, a fifth message for requesting to establish a tunnel for the second terminal device; and
send, to the group session management network element, tunnel information of the second user plane network element serving the second terminal device.

13. A communication system, wherein the communication system comprises:
a group session management network element and a second session management network element,
the group session management network element is configured to obtain tunnel information of a first user plane network element serving a first terminal device belonging to a first virtual network group, wherein the first user plane network element is managed by a first session management network element;
the group session management network element is further configured to send a first message to the second session management network element, wherein the first message comprises an identifier of the first terminal device, an identifier of the first virtual network group, and the tunnel information of the first user plane network element; and the second session management network element is configured to: receive the first message from the group session management network element, and configure, based on the identifier of the first terminal device, the identifier of the first virtual network group, and the tunnel information of the first user plane network element, a first forwarding rule on a second user plane network element managed by the second session management network element, wherein the first forwarding rule is configured to indicate to the second user plane network element to send a first data packet to the first user plane network element when one terminal device that belongs to the first virtual network group and that is served by the second user plane network element sends the first data packet to the first terminal device.

14. The communication system according to claim 13, wherein the communication system further comprises the first session management network element;
the first session management network element is configured to: send, in a process in which the first terminal device establishes a session, a second message to the group session management network element, wherein the second message comprises the identifier of the first terminal device and an identifier of the first session management network element; and
the group session management network element is further configured to: receive the second message from the first session management network element, and store a mapping relationship between the identifier of the first terminal device and the identifier of the first session management network element.

15. The communication system according to claim 14, wherein the second message further comprises at least one of the identifier of the first virtual network group and the tunnel information of the first user plane network element serving the first terminal device; and
that the group session management network element is further configured to store a mapping relationship between the identifier of the first terminal device and the identifier of the first session management network element comprises:
the group session management network element is further configured to store a mapping relationship between the identifier of the first terminal device, the identifier of the first session management network element, and at least one of the identifier of the first virtual network group and the tunnel information of the first user plane network element.

16. The communication system according to claim 15, wherein the group session management network element is configured to: obtain, when the mapping relationship comprises the tunnel information of the first user plane network element, the stored tunnel information of the first user plane network element serving the first terminal device.

17. The communication system according to claim 15, wherein the group session management network element is configured to: send, when the mapping relationship does not comprise the tunnel information of the first user plane network element, a third message to the first session management network element, wherein the third message is used to request to establish a tunnel for the first terminal device; and
the group session management network element is further configured to receive the tunnel information that is of the first user plane network element serving the first terminal device and that is from the first session management network element.

18. The communication system according to claim 17, wherein
the second session management network element is further configured to send, to the group session management network element, tunnel information of the second user plane network element serving a second terminal device belonging to the first virtual network group;
the group session management network element is further configured to receive, from the second session management network element, the tunnel information of the second user plane network element serving the second terminal device;
the group session management network element is further configured to send a fourth message to the first session management network element, wherein the fourth message comprises an identifier of the second terminal device, the identifier of the first virtual network group, and the tunnel information of the second user plane network element; and
the first session management network element is further configured to: receive the fourth message from the group session management network element, and configure a second forwarding rule on the first user plane network element based on the identifier of the second terminal device, the identifier of the first virtual network group, and the tunnel information of the second user plane network element, wherein the second forwarding rule is configured to indicate to the first user plane network element to send a second data packet to the second user plane network element when one terminal device that belongs to the first virtual network group and that is served by the first user plane network element sends the second data packet to the second terminal device.

19. The communication system according to claim 13, wherein
the second session management network element is further configured to receive, from the second user plane network element, a fifth message for requesting the first forwarding rule; send, after determining that the first forwarding rule does not exist on the second session management network element, a sixth message for requesting the first forwarding rule to the group session management network element; and
the group session management network element is further configured to: receive the sixth message from the second session management network element.

* * * * *

UNITED STATES PATENT AND TRADEMARK OFFICE
CERTIFICATE OF CORRECTION

PATENT NO. : 12,015,503 B2
APPLICATION NO. : 17/526339
DATED : June 18, 2024
INVENTOR(S) : Qi Yao et al.

It is certified that error appears in the above-identified patent and that said Letters Patent is hereby corrected as shown below:

On the Title Page

In item (56), in Column 2, under "Other Publications", Line 3, delete "13-7," and insert -- 13-17, --.

Signed and Sealed this
First Day of October, 2024

Katherine Kelly Vidal
*Director of the United States Patent and Trademark Office*